US009451214B2

(12) United States Patent
Ko et al.

(10) Patent No.: US 9,451,214 B2
(45) Date of Patent: Sep. 20, 2016

(54) INDOOR SURVEILLANCE SYSTEM AND INDOOR SURVEILLANCE METHOD

(71) Applicants: KOREA UNIVERSITY RESEARCH AND BUSINESS FOUNDATION, Seoul (KR); Hanwha Techwin Co., Ltd., Changwon-Si (KR)

(72) Inventors: Hanseok Ko, Seoul (KR); Younghyun Lee, Seoul (KR); Kwangyoun Kim, Seoul (KR); Bonhwa Ku, Seoul (KR); Taeyup Song, Seoul (KR); Hanjun Kim, Seoul (KR)

(73) Assignees: KOREA UNIVERSITY RESEARCH AND BUSINESS FOUNDATION, Seoul (KR); Hanwha Techwin Co., Ltd., Changwon-si (KR)

( * ) Notice: Subject to any disclaimer, the term of this patent is extended or adjusted under 35 U.S.C. 154(b) by 896 days.

(21) Appl. No.: 13/667,804

(22) Filed: Nov. 2, 2012

(65) Prior Publication Data

US 2014/0055610 A1 Feb. 27, 2014

(30) Foreign Application Priority Data

Aug. 27, 2012 (KR) ........................ 10-2012-0093894

(51) Int. Cl.
*H04N 7/18* (2006.01)
*G06T 7/00* (2006.01)
(Continued)

(52) U.S. Cl.
CPC ............ *H04N 7/18* (2013.01); *G06K 9/00771* (2013.01); *G06K 9/6277* (2013.01); *G06T 7/0081* (2013.01); *G06T 2207/20144* (2013.01); *G06T 2207/30232* (2013.01)

(58) Field of Classification Search
None
See application file for complete search history.

(56) References Cited

U.S. PATENT DOCUMENTS 8,140,458 B2 3/2012 Sawada
8,180,638 B2 5/2012 Kim et al.
(Continued)

FOREIGN PATENT DOCUMENTS

KR 100738522 B1 7/2007
KR 101014321 B1 2/2011
(Continued)

OTHER PUBLICATIONS

Aggarwal, Ashwani, et al., "Object Tracting Using Background Subtraction and Motion Estimation in MPEG Videos", ACCV2006, LNCS 3852, pp. 121-130, Springer-Verlag Berlin Heidelberg (2006).*

(Continued)

*Primary Examiner* — William C Vaughn, Jr.
*Assistant Examiner* — Lindsay Uhl
(74) *Attorney, Agent, or Firm* — Sughrue Mion, PLLC

(57) ABSTRACT

A surveillance system and method are provided. The surveillance system includes an audio processing device which extracts an audio feature of an audio signal, and determines whether an abnormal event has occurred in a monitoring region, based on the audio feature; a video processing device which extracts a foreground region from a video signal, and determines whether an abnormal event has occurred in the monitoring region, based on motion information of the foreground region; and a context awareness device which calculates an audio abnormal probability and a video abnormal probability by respectively accumulating results of abnormal event occurrence/non-occurrence determinations performed on audio signals and results of abnormal event occurrence/non-occurrence determinations performed on video signals for a certain period of time, and finally determines whether an abnormal situation has occurred in the monitoring region, by using respective combined probability distribution models for a normal situation and the abnormal situation.

20 Claims, 18 Drawing Sheets

(51) Int. Cl.
*G06K 9/00* (2006.01)
*G06K 9/62* (2006.01)

(56) References Cited

U.S. PATENT DOCUMENTS 8,300,890 B1 * 10/2012 Gaikwad ............... H04N 5/144
382/103
2006/0133785 A1 6/2006 Ko et al.

FOREIGN PATENT DOCUMENTS

KR   1020110025886 A   3/2011
WO   2011025085 A1   3/2011

OTHER PUBLICATIONS

Toreyin, B. Ugur, et al., "HMM Based Falling Person Detection Using Both Audio and Video", Signal Processing and Communications Applications, 2006 IEEE (Apr. 14, 2006).*
Antonakaki, Panagiota, et al., "Detecting Abnormal Human Behaviour Using Multiple Cameras" (Dec. 2008).*
Lee et al., "Hostile Intent and Behaviour Detection in Elevators", 4th International Conference on Imaging for Crime Detection and Prevention—IET (The Institution of Engineering and Technology), Nov. 3-4, 2011, Kingston University, London, UK, 12 pages total.
Lee et al., "Acoustic and Visual Signal Based Violence Detection System for Indoor Security Application", IEEE International Confrernce on Consumer Electronics (ICCE), Jan. 13-16, 2012, Las Vegas, NV U.S.A, 40 pages total.

* cited by examiner

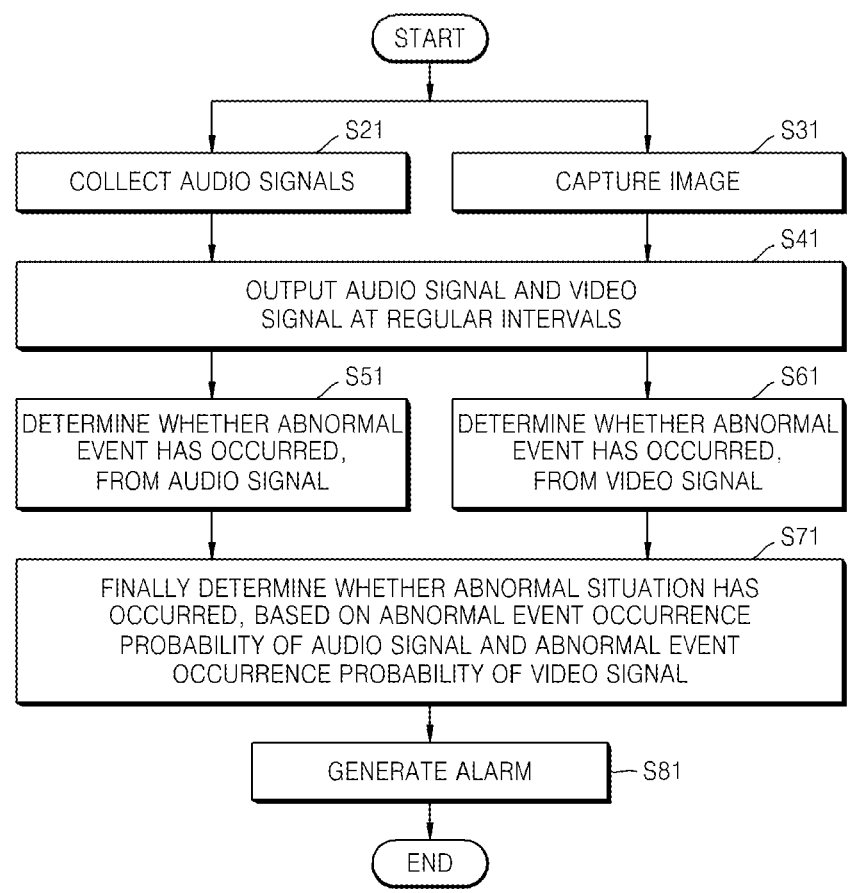

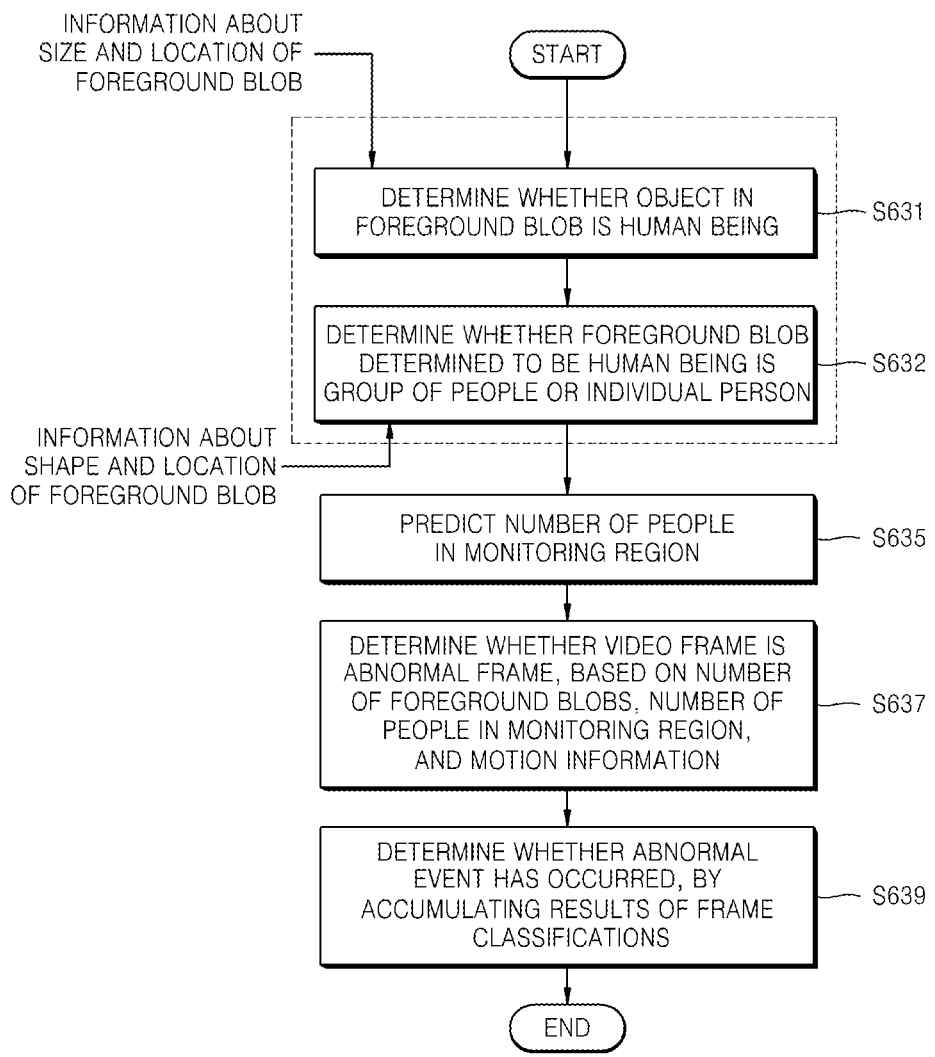

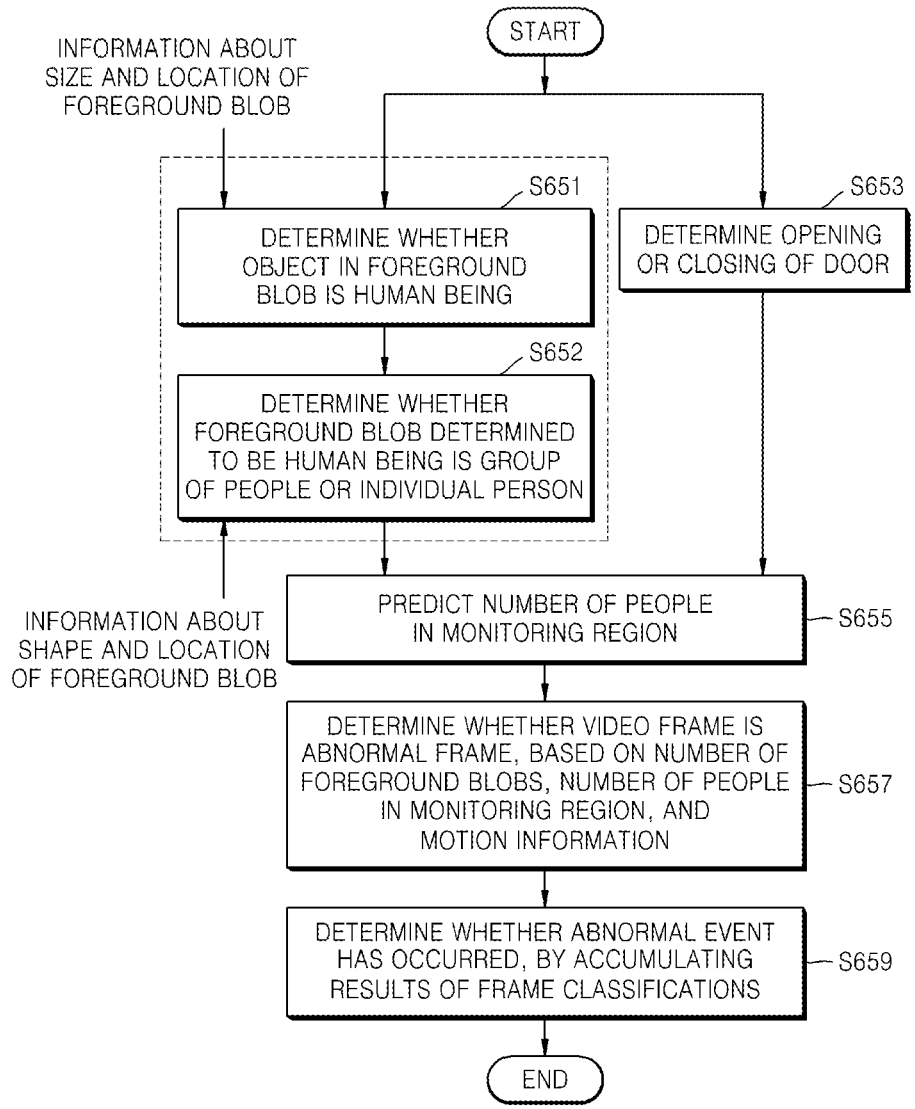

INDOOR SURVEILLANCE SYSTEM AND INDOOR SURVEILLANCE METHOD

CROSS-REFERENCE TO RELATED PATENT APPLICATION

This application claims priority from Korean Patent Application No. 10-2012-0093894, filed on Aug. 27, 2012, in the Korean Intellectual Property Office, the disclosure of which is incorporated herein in its entirety by reference.

BACKGROUND

1. Field

Apparatuses and methods consistent with exemplary embodiments relate to indoor surveillance.

2. Description of the Related Art

As the number of people and vehicles continuously increases in modern society, various incidents between people and vehicles are also increasing. Accordingly, video surveillance systems have been introduced and applied to various fields such as indoor/outdoor space security surveillance, traffic security surveillance, and the like. Video surveillance systems are used to detect/recognize/pursue suspicious objects and ascertain behaviors of suspicious objects. However, related art video surveillance systems make surveillance personnel watch many monitors simultaneously and for a long time.

There is a need, therefore, for an intelligent video surveillance system. Since an intelligent video surveillance system automatically recognizes an abnormal event in a monitored region and informs surveillance personnel of an abnormal event, the intelligent video surveillance system is more effectively operated.

SUMMARY

Video surveillance systems use only visual elements, and thus, the reliability in determining an event occurrence in a region of interest may decrease. One or more exemplary embodiments provide a reliable surveillance system by fusing information about images with information about sound.

According to an aspect of an exemplary embodiment, there is provided a surveillance system including: an audio processing device which extracts an audio feature of an audio signal, and determines whether an abnormal event has occurred in a monitoring region, based on the audio feature; a video processing device which extracts a foreground region from a video signal, and determines whether an abnormal event has occurred in the monitoring region, based on motion information of the foreground region; and a context awareness device which calculates an audio abnormal probability and a video abnormal probability by respectively accumulating results of abnormal event occurrence/non-occurrence determinations performed on audio signals and results of abnormal event occurrence/non-occurrence determinations performed on video signals for a certain period of time, and finally determines whether an abnormal situation has occurred in the monitoring region, by using respective combined probability distribution models for a normal situation and the abnormal situation.

The video processing device may include an indoor surveillance system including a foreground detection unit which predicts a foreground pixel based on foreground region information and motion information extracted from a video frame and performs validation on the predicted foreground pixel based on a texture feature so as to extract a foreground BLOB; and an event detection unit which classifies the video frame based on the motion information, and determines whether an abnormal event has occurred in a monitoring region, based on results of classifications of a certain number of video frames.

The foreground detection unit may include: a background separation unit which predicts a foreground region from the video frame by separating a background pixel from a foreground pixel; a motion extraction unit which extracts a motion vector of each pixel from the video frame; a probability calculation unit which extracts a texture feature of each pixel by using a correlation between a reference background frame and the video frame, and calculates a foreground pixel probability for each pixel from a texture feature histogram; and a foreground determination unit which compares a foreground pixel probability of a pixel predicted as a foreground from the predicted foreground region and a region having a motion vector equal to or greater than a predetermined value with a threshold value, and determines the predicted pixel to be a foreground pixel if the foreground pixel probability is equal to or greater than the threshold value.

The foreground detection unit may adjust the foreground pixel probability by using foreground BLOB information of a previous video frame and determine, to be a foreground pixel, a pixel of which the adjusted foreground pixel probability is equal to or greater than the threshold value.

The indoor surveillance system may further include a post-processing unit which removes a reflector from a detected foreground region by using a bottom surface model of the monitoring region.

The event detection unit may include: an object classification unit which determines whether an object in the foreground BLOB is a human being, based on information about a size and location of the foreground BLOB, and classifies a foreground BLOB determined to be a human being into a group of people or an individual person, based on information about a shape and location of the foreground BLOB; a number-of-people prediction unit which predicts a number of people in the video frame based on a result of the foreground BLOB classification; a frame classifier which classifies the video frame based on a number of foreground BLOBs, the number of people in the video frame, an average motion size of the foreground BLOB, and a degree of consistency of motion directions in the foreground BLOB; and an event determination unit which determines that an abnormal event has occurred in the monitoring region, if a ratio of a number of times an abnormal frame is classified among the certain number of video frames to a total number of times the classifications is equal to and greater than a first threshold value.

The frame classifier may classify the video frame into the abnormal frame if the number of foreground BLOBs in the video frame is equal to or greater than 1, the predicted number of people in the video frame is equal to or greater than 2, an average motion size of the foreground BLOB is equal to or greater than a second threshold value, and the degree of consistency of the motion directions is less than or equal to a third threshold value.

The event detection unit may further include a door state detection unit which detects a door-opened/closed state of the monitoring region. The number-of-people prediction unit may predict the number of people in consideration of the door-opened/closed state.

The door state detection unit may detect the door-opened/closed state based on the number of foreground pixels in an upper region of a door.

The audio processing device may include: a feature extraction unit which generates an audio frame from the audio signal and extracts the audio feature from the audio frame; a probability estimation unit which calculates a likelihood between the extracted audio feature and each audio model, and selects an audio model having a highest likelihood; an audio classifier which classifies the audio frame according to a hierarchical approach method; and an event determination unit which determines that the abnormal event has occurred in the monitoring region, if a ratio of a number of times the audio frame is classified into the abnormal event to a total number of times the classification is performed by the audio classifier for a certain period of time is equal to and greater than a threshold value.

If energy of the audio frame is less than a threshold value, the audio classifier classifies the audio frame into a normal event, and, if the energy of the audio frame is greater than the threshold value, the audio classifier classifies the audio frame into a normal event or the abnormal event.

According to an aspect of another exemplary embodiment, there is provided an indoor surveillance method including: extracting an audio feature of an audio signal, and determining whether an abnormal event has occurred in a monitoring region, based on the audio feature; extracting a foreground region from a video signal, and determining whether an abnormal event has occurred in the monitoring region, based on motion information of the foreground region; and calculating an audio abnormal probability and a video abnormal probability by respectively accumulating results of abnormal event occurrence/non-occurrence determinations performed on audio signals and results of abnormal event occurrence/non-occurrence determinations performed on video signals for a certain period of time, and finally determining whether an abnormal situation has occurred in the monitoring region, by using respective combined probability distribution models for a normal situation and the abnormal situation.

The determination of abnormal event occurrence/non-occurrence with respect to the video signal may include: predicting a foreground pixel based on foreground region information and motion information extracted from a video frame and performing validation on the predicted foreground pixel based on a texture feature so as to extract a foreground BLOB; classifying the video frame based on the motion information; and determining whether an abnormal event has occurred in a monitoring region, based on results of classifications of a certain number of video frames.

The extracting of the foreground BLOB may include: separating a background pixel and a foreground pixel of the video frame; extracting a motion vector of each pixel from the video frame; extracting a texture feature of each pixel by using a correlation between a reference background frame and the video frame and calculating a foreground pixel probability for each pixel from a texture feature histogram; and comparing a foreground pixel probability of a pixel predicted as a foreground from the predicted foreground region and a region having a motion vector equal to or greater than a predetermined value with a threshold value, and determining the predicted pixel to be a foreground pixel if the product is equal to or greater than the threshold value.

The indoor surveillance method may further include adjusting the foreground pixel probability by using foreground BLOB information of a previous video frame and determining, to be a foreground pixel, a pixel of which the adjusted foreground pixel probability is equal to or greater than the threshold value.

The indoor surveillance method may further include removing a reflector from a detected foreground region by using a bottom surface model of the monitoring region.

The determination of abnormal event occurrence/non-occurrence with respect to the video signal may include: determining whether an object in the foreground BLOB is a human being, based on information about a size and location of the foreground BLOB, and classifying a foreground BLOB determined to be a human being into a group of people or an individual person, based on information about a shape and location of the foreground BLOB; predicting the number of people in the video frame based on a result of the foreground BLOB classification; classifying the video frame based on a number of foreground BLOBs, a number of people in the video frame, an average motion size of the foreground BLOB, and a degree of consistency of motion directions in the foreground BLOB; and determining that an abnormal event has occurred in the monitoring region, if a ratio of a number of times an abnormal frame is classified among the certain number of video frames to a total number of times the classifications is equal to and greater than a first threshold value.

The classifying of the video frame may include classifying the video frame into the abnormal frame if the number of foreground BLOBs in the video frame is equal to or greater than 1, the predicted number of people in the video frame is equal to or greater than 2, the average motion size of the foreground BLOB is equal to or greater than a second threshold value, and the degree of consistency of the motion directions is less than or equal to a third threshold value.

The indoor surveillance method may further include detecting a door-opened/closed state of the monitoring region. The predicting of the number of people may include predicting the number of people in consideration of the door-opened/closed state. The door-opened/closed state may be detected based on the number of foreground pixels in an upper region of a door.

The determining of abnormal event occurrence/non-occurrence with respect to the audio signal may include: generating an audio frame from the audio signal and extracting the audio feature from the audio frame; calculating a likelihood between the extracted audio feature and each audio model and selecting an audio model having a highest likelihood; classifying the audio frame according to a hierarchical approach method; and determining that the abnormal event has occurred in the monitoring region, if a ratio of a number of times the audio frame is classified into the abnormal event to a total number of times the classification is performed by the audio classifier for a certain period of time is equal to and greater than a threshold value.

In the classifying of the audio frame, if energy of the audio frame is less than a threshold value, the audio frame may be classified into a normal event, and if the energy of the audio frame is greater than the threshold value, the audio frame may be classified into a normal event or an abnormal event.

The present invention may provide a stable, efficient surveillance system by detecting abnormal events by fusing video information with audio information.

BRIEF DESCRIPTION OF THE DRAWINGS

The above and other aspects will become more apparent by describing in detail exemplary embodiments thereof with reference to the attached drawings in which:

FIG. 2 is a flowchart of a monitoring method of the indoor surveillance system illustrated in FIG. 1, according to an exemplary embodiment;

FIG. 18 is a flowchart of an operation of the event detection unit illustrated in FIG. 17, according to an exemplary embodiment;

FIG. 22 is a flowchart of an operation of the event detection unit illustrated in FIG. 21, according to an exemplary embodiment.

DETAILED DESCRIPTION OF THE EXEMPLARY EMBODIMENTS

Hereinafter, exemplary embodiments will be described more fully with reference to the accompanying drawings.

Audio information, which is an auditory element, is not affected by an illumination change, a shadow, and the like, which have been pointed out as weak points of existing video surveillance systems. In particular, surveillance of indoor environments is advantageous to obtain audio information. The exemplary embodiments provide an environmentally-strong, good-performance indoor surveillance system that uses an audio signal and a video signal according to an information combination model.

Figure 1:
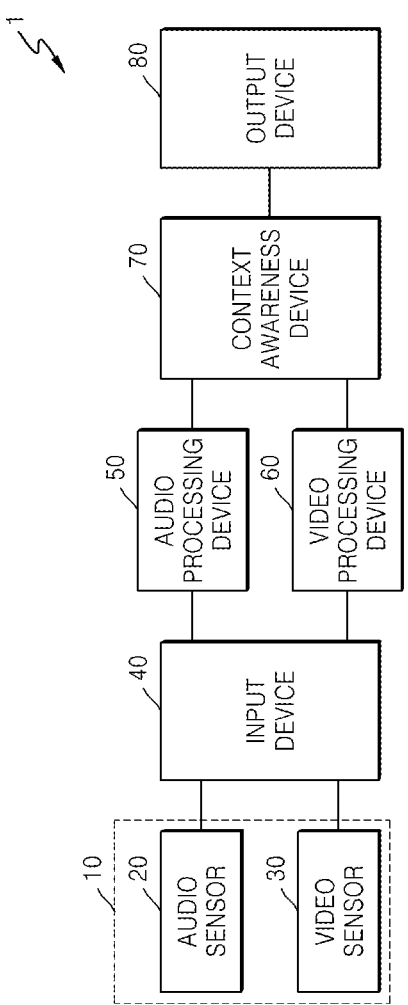
FIG. 1 is a block diagram of an indoor surveillance system according to an exemplary embodiment.

FIG. 1 is a block diagram of an indoor surveillance system 1 according to an exemplary embodiment. FIG. 2 is a flowchart of a surveillance method of the indoor surveillance system 1 of FIG. 1, according to an exemplary embodiment.

Indoor surveillance technology based on a video signal is affected by an illumination. In a low-illumination environment, object detection is difficult, leading to a low detection rate. In an environment where illumination severely changes, like door opening or closing, an object false-detection rate increases. When a wall surface or the like is a reflective surface, the rate of false detection is high. In indoor surveillance technology based on audio signals, detection of abnormal activity generating no audio information is difficult for some reasons such as covering the mouth and a limitation in microphone performance. Moreover, audio information is not enough to accurately ascertain indoor conditions, such as the number of people and door opening or closing. Accordingly, the indoor surveillance system 1 may improve accuracy of context awareness by improving a monitoring function using both audio information and video information.

The indoor surveillance system 1 may monitor enclosed and desolate spaces such as the inside of elevators, stairs, underground parking lots, senior citizens centers, playgrounds, and trails around apartments or buildings. Referring to FIG. 1, the indoor surveillance system 1 includes a sensor 10, an input device 40, an audio processing device 50, a video processing device 60, a context awareness device 70, and an output device 80.

The sensor 10 includes an audio sensor 20 and a video sensor 30. The audio sensor 20 collects audio signals generated in a monitoring region, in operation S21. In operation S31, the video sensor 30 captures an image of the monitoring region by using a digital and/or analog camera. The audio sensor 20 and the video sensor 30 may be installed separately from each other, or may be integrally formed with each other. For example, the audio sensor 20 may be built in the video sensor 30. At least one audio sensor 20 and at least one video sensor 30 may be distributed and arranged according to a situation in the monitoring region.

The input device 40 receives an audio signal from the audio sensor 20 and stores the audio signal at a predetermined sampling rate. The input device 40 also receives a video signal from the video sensor 30 at a predetermined frame rate. The audio signal and the video signal need to be synchronized with each other, because they have different input cycles. To this end, the input device 40 outputs the audio signal and the video signal to the audio processing device 50 and the video processing device 60, respectively, at regular intervals, in operation S41.

In operation S51, the audio processing device 50 determines whether an abnormal event has occurred in the monitoring region, by performing extraction of features of the audio signal and audio class recognition. The audio processing device 50 generates an audio frame of a predetermined time unit from the audio signal and extracts an audio feature from the audio frame. Next, the audio processing device 50 classifies the audio frame. The audio processing device 50 identifies the classified audio frame as a normal or abnormal event. The audio processing device 50 determines whether an abnormal event has occurred, based on the number of times an abnormal event has occurred for a certain period of time.

In operation S61, the video processing device 60 determines whether an abnormal event has occurred in the monitoring region, by performing foreground detection and motion information extraction. The video processing device 60 detects a foreground in units of frames by using a background subtraction algorithm and an optical flow technique, and identifies a video frame as a normal or abnormal event via foreground analysis. The video processing device 60 determines whether an abnormal event has occurred, based on the number of times an abnormal event has occurred for a certain period of time.

In operation S71, the context awareness device 70 finally determines whether an abnormal situation has occurred in the monitoring region, based on results of the abnormal event occurrence/non-occurrence determinations that are periodically received from the audio processing device 50 and the video processing device 60. The context awareness device 70 calculates an audio abnormal probability $P_A$ and a video abnormal probability $P_V$ by accumulating the results of the abnormal event occurrence/non-occurrence determinations from the audio processing device 50 and the video processing device 60 for a certain period of time. The audio abnormal probability $P_A$ corresponds to the number of times it is determined that an abnormal event has occurred out of the number of abnormal event occurrence/non-occurrence determination results received from the audio processing device 50 for a certain period of time. The video abnormal probability $P_V$ corresponds to the number of times it is determined that an abnormal event has occurred out of the number of abnormal event occurrence/non-occurrence determination results received from the video processing device 60 for a certain period of time.

Figure 3A:
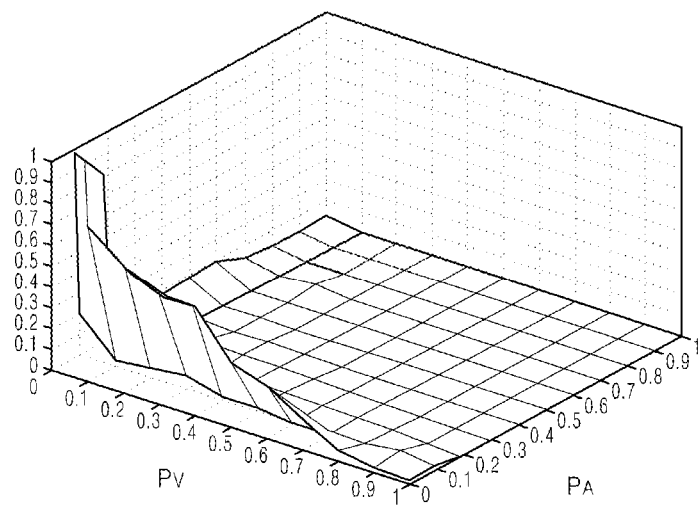
FIGS. 3A and 3B illustrate combined probability distribution models according to an exemplary embodiment.
Figure 3B:
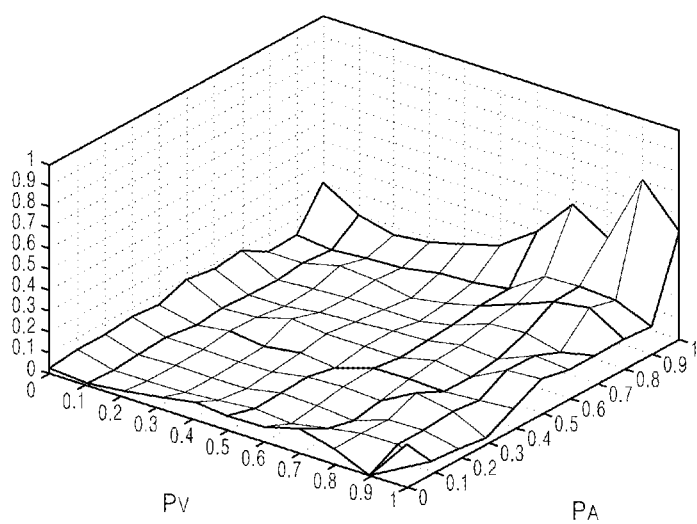

The context awareness device 70 includes respective pre-generated combined probability distribution models for a normal situation and an abnormal situation. FIGS. 3A and 3B illustrate combined probability distribution models according to an exemplary embodiment. FIG. 3A illustrates a distribution of the audio abnormal probability $P_A$ and the video abnormal probability $P_V$ in a normal situation. FIG. 3B illustrates a distribution of the audio abnormal probability $P_A$ and the video abnormal probability $P_V$ in an abnormal situation. Based on results of the abnormal event occurrence/non-occurrence determinations that are periodically received from the audio processing device 50 and the video processing device 60, the context awareness device 70 calculates a combined probability of the audio abnormal probability $P_A$ and the video abnormal probability $P_V$ with regard to each of the normal and abnormal situations from the respective combined probability distribution models for the normal and abnormal situations. When a ratio between the combined probabilities for the normal and abnormal situations is greater than a threshold value T, the context awareness device 70 finally determines that an abnormal situation has occurred. On the other hand, when the ratio between the combined probabilities for the normal and abnormal situation is equal to or less than the threshold value T, the context awareness device 70 finally determines that an abnormal situation has not occurred. Expression (1) expresses a method of determining whether an abnormal situation has occurred, in which $H_0$ denotes a normal situation and $H_1$ denotes an abnormal situation. $(P_A, P_V)$ denotes a combined probability of the audio abnormal probability $P_A$ and the video abnormal probability $P_V$. The threshold value T denotes a ratio between $P(H_0)$ and $P(H_1)$ and may be set by a user.

$$\frac{p[(P_A, P_V) | H_1]}{p[(P_A, P_V) | H_0]} \overset{violence}{\underset{normal}{\gtrless}} T\left(= \frac{p(H_0)}{p(H_1)}\right) \quad (1)$$

In operation S81, the output device 80 may include a display and a speaker and may generate an alarm if it is determined that an abnormal situation has occurred. The display outputs video signals received via a plurality of channels. A detected foreground region of an image displayed on the display may be marked with a box, and a user may be warned by highlighting the edge or entire region of an image of a channel determined to be an abnormal situation. The speaker outputs audio signals received via a plurality of channels. As for a sound of a channel determined to be an abnormal situation, a warning sound may be output via the speaker to warn the user.

Figure 4:
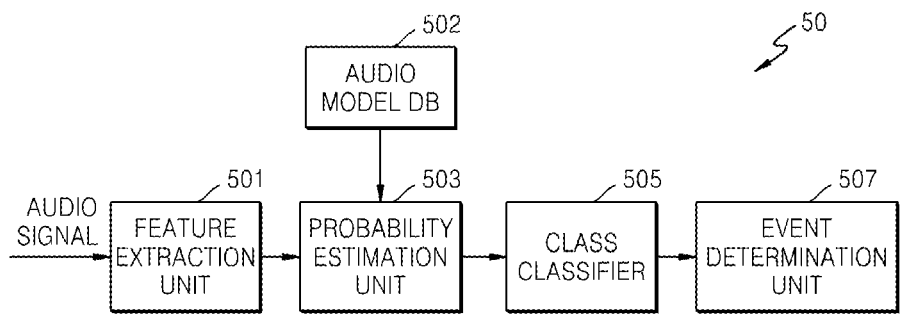
FIG. 4 is a block diagram of an audio processing device included in the indoor surveillance system illustrated in FIG. 1 according to exemplary an embodiment.
Figure 5:
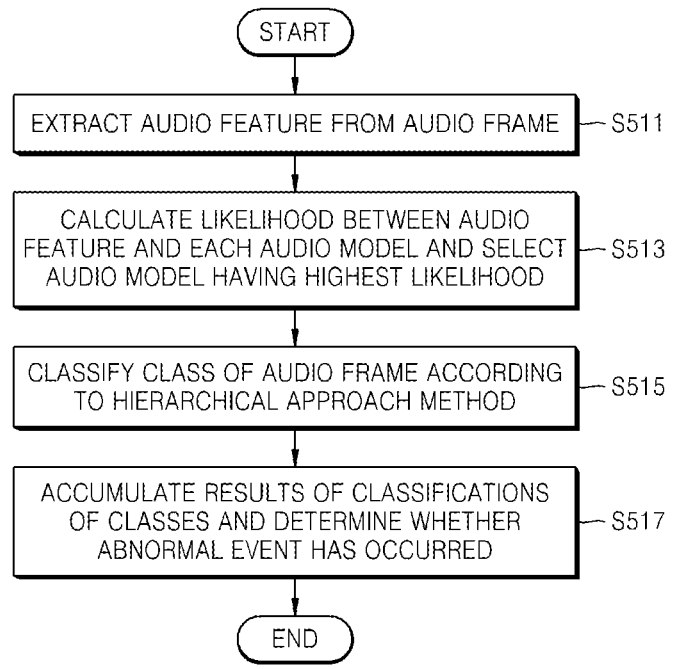
FIG. 5 is a flowchart of an operation of the audio processing device illustrated in FIG. 4, according to an exemplary embodiment.

FIG. 4 is a block diagram of the audio processing device 50 according to an exemplary embodiment. FIG. 5 is a flowchart of an operation of the audio processing device 50 of FIG. 4, according to an exemplary embodiment.

The audio processing device 50 includes a feature extraction unit 501, an audio model database (DB) 502, a probability estimation unit 503, an audio classifier 505, and an event determination unit 507.

In operation S511, the feature extraction unit 501 extracts a feature from a received audio signal. According to an exemplary embodiment, a Mel-frequency Cepstral Coefficients (MFCC) feature is used, which is a feature vector extracted in a low frequency region in more detail than in a high frequency region and is capable of being customized via various parameters. Since an MFCC feature extracting method is commonly used in the field of acoustic recognition technology, a detailed description thereof is omitted. The MFCC feature comprises an MFCC feature and a Delta feature corresponding to an MFCC variation over time (hereinafter referred to as an MFCC feature). According to an exemplary embodiment, a feature vector obtained by combining a 20-dimension MFCC and a 20-dimension Delta feature may be used.

Figure 6:
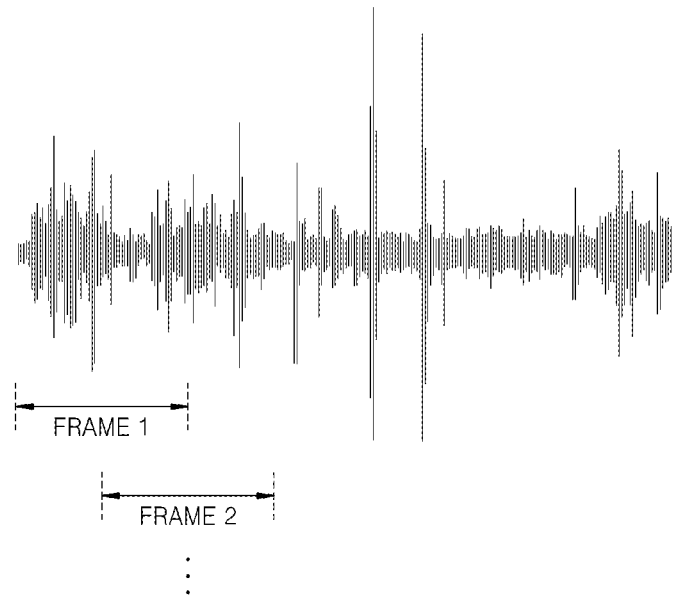
FIG. 6 is a view for explaining an audio frame generating method according to an exemplary embodiment.

FIG. 6 is a view for explaining an audio frame generating method according to an exemplary embodiment. Referring to FIG. 6, an audio frame is generated by applying a window to an audio signal in order to extract an MFCC feature vector. In an exemplary embodiment, as illustrated in FIG. 6, audio frames are generated using a window such that adjacent audio frames partially overlap each other, whereby the accuracy of event detection may be increased.

The audio model DB 502 includes models for various audio events generated by training audio features by using a Gaussian Mixture Model (GMM). The GMM is defined by Equation (2), where k denotes the number of GMM mixtures, d denotes a dimensionality of a feature, x denotes a feature vector, $R_i$ and $m_i$ denote a covariance matrix and a mean, respectively, of an i-th GMM mixture, and $\alpha_i$ denotes a weighted value of the i-th GMM mixture.

$$f(x) = \sum_{i=1}^{k} \alpha_i \frac{1}{\sqrt{(2\pi)^d |R_i|}} \exp\left\{-\frac{1}{2}(x-m_i)^T R_i^{-1}(x-m_i)\right\} \quad (2)$$

An audio feature extracted from audios of a training DB of audio classes is trained with statistical values of a mean and a variance. At this time, a GMM parameter is updated using maximum likelihood (ML) criteria.

Figure 7:
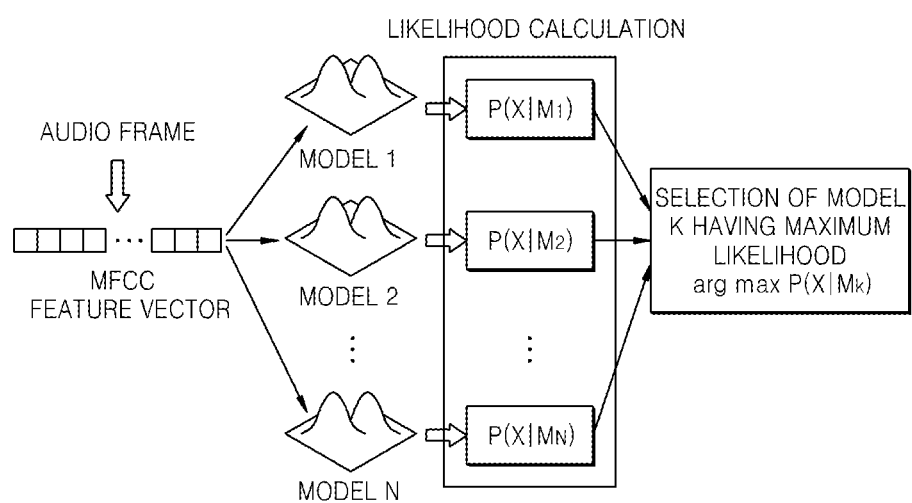
FIG. 7 is a block diagram for explaining an audio feature estimating method according to an exemplary embodiment.

Referring back to FIG. 5, in operation S513, the probability estimation unit 503 calculates a likelihood between an audio feature extracted from an audio frame and each audio model of the audio model DB 502, and selects an audio model having a highest likelihood according to the ML criteria. FIG. 7 is a block diagram for explaining an audio feature estimating method according to an exemplary embodiment. Referring to FIG. 7, an MFCC feature vector is extracted from an audio frame, and a likelihood between the MFCC feature vector and each audio model of the audio model DB 502 is calculated. An audio model k having a maximum likelihood value is selected.

Referring back to FIG. 5, in operation S515, the audio classifier 505 classifies an audio frame according to a hierarchical approach method. Audio frames may be roughly classified into two categories. Audio frames, such as screaming, crying, normal conversations, and information commentaries, may be classified into a vocal category, because they are sounds coming out of the neck of a person. Collisions, noise made by opening or closing a door, stepping sounds, sounds coming out of empty elevators, and alarm bell sounds may be classified into a non-vocal category. Vocal and non-vocal events are not limited to the aforementioned items, but may be set variously according to a system design. The classification of audio frames according to a hierarchical approach method may contribute to reduction of misrecognition between audio frames included in the vocal and non-vocal categories. Audio frames classified into the vocal and non-vocal categories are identified as normal events or abnormal events. An abnormal event is defined as collision, screaming, crying, or the like, and a normal event is defined as a conversation, a stepping sound, noise made by opening and closing a door, silence, or the like.

If an audio frame having larger energy than a general normal situation is classified into an abnormal event, this may be false detection of the audio frame as an abnormal event on account of large energy even when the audio frame is generated as a normal event. When an MFCC feature in a frequency region is extracted and an audio frame is classified, and the MFCC feature has a similar frequency shape to abnormal sound, a normal situation may be misrecognized as an abnormal situation. Since the energy size of an abnormal event cannot be smaller than that of a normal event, an audio frame having small energy is classified into a normal event, and thus, false detection of a normal event as an abnormal event may be reduced. Accordingly, the exemplary embodiment further includes an operation of comparing the energy of an audio frame with a threshold value, thereby classifying the audio frame. In other words, when the energy of an audio frame is greater than the threshold value, the audio frame may be classified into a normal event or an abnormal event. On the other hand, when the energy of the audio frame is smaller than the threshold value, the audio frame may be classified into a normal event.

In operation S517, the event determination unit 507 accumulates results of classifications of a certain number of audio frames and determines whether an abnormal event has occurred in the monitoring region, based on the accumulated classification results.

Figure 8:
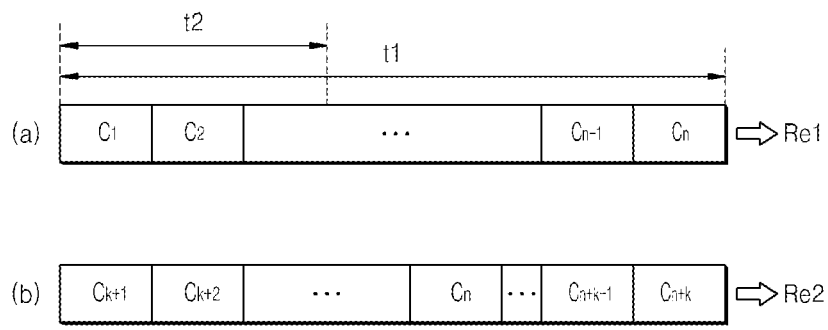
FIG. 8 is a diagram for explaining a method of determining occurrence or non-occurrence of an abnormal event in the audio processing device, according to an exemplary embodiment.

FIG. 8 is a diagram for explaining a method of determining occurrence or non-occurrence of an abnormal event in the audio processing device 50, according to an exemplary embodiment. Referring to FIGS. 4 and 8, the event determination unit 507 receives and accumulates results of classifications of audio frames for a first period of time t1. The event determination unit 507, according to Inequality (3) below, determines that an abnormal event has occurred, if the number of times an audio frame is classified into an abnormal event out of the total number of times classification is performed for a first period of time t1 is equal to and greater than a threshold value Td. The event determination unit 507 makes determinations Re1, Re2, and so forth as to whether an abnormal event has occurred, at intervals of a second period of time t2 (where t2<t1). For example, the event determination unit 507 receives eight class-classification results every 0.2 seconds (i.e., the second period of time t2) and performs an abnormal event occurrence/non-occurrence determination with respect to 40 class-classification results accumulated for one second (i.e., the first period of time t1) (Re1). The event determination unit 507 receives another eight class-classification results after 0.2 seconds and performs an abnormal event occurrence/non-occurrence determination with respect to 32 previous class-classification results and eight new class-classification results, namely, 40 class-classification results (Re2).

$$\frac{\text{number of times audio frame is classified into abnormal event}}{\text{number of times classification of audio frame is performed for period } t1} \geq T_d \quad (3)$$

Figure 9:
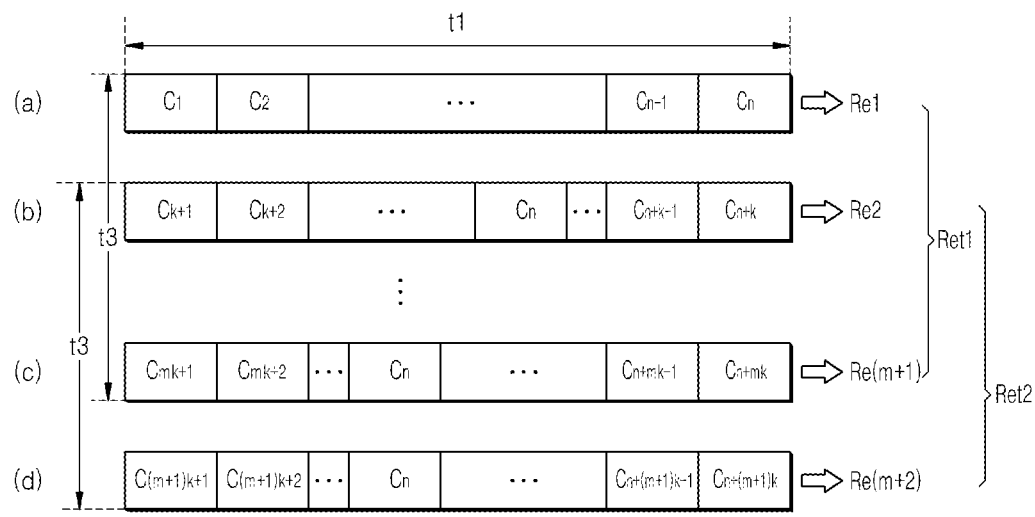
FIG. 9 is a diagram for explaining a method of determining occurrence or non-occurrence of an abnormal event in the audio processing device, according to another exemplary embodiment.

FIG. 9 is a diagram for explaining a method of determining occurrence or non-occurrence of an abnormal event in the audio processing device 50, according to another exemplary embodiment. Referring to FIGS. 4 and 9, the event determination unit 507 determines whether an abnormal event has occurred, at intervals of the second period of time t2 according to Inequality (3), and accumulates the determination results for a third period of time t3. The event determination unit 507 finally determines that an abnormal event has occurred, if the number of times it is determined that an abnormal event has occurred out of the number m+1 of abnormal event occurrence/non-occurrence determinations Re1, Re2, . . . , and Re(m+1) performed for the third period of time t3 is equal to and greater than the threshold value $T_d$, according to Inequality (4) below. The event determination unit 507 makes final determinations Ret1, Ret2, and so forth as to whether an abnormal event has occurred, at intervals of the second period of time t2. For example, the event determination unit 507 accumulates results of the abnormal event occurrence/non-occurrence determinations Re1, Re2, and so forth made with respect to 40 class-classification results accumulated for the period of time t1, for example, one second, as illustrated in FIG. 8, performs the abnormal event occurrence/non-occurrence determination 10 times for the third period of time t3, for example, two seconds, and performs the final abnormal event occurrence/non-occurrence determination Ret1 based on the number of times it is determined that an abnormal event has occurred out of the 10 abnormal event occurrence/non-occurrence determinations, as illustrated in FIG. 9. The event determination unit 507 receives another eight classification results after 0.2 seconds and performs the final abnormal event occurrence/non-occurrence determination Ret2 with respect to results of 9 previous abnormal event occurrence/non-occurrence determinations and a result of one new abnormal event occurrence/non-occurrence determination.

$$\frac{\text{number of times audio frame is classified into abnormal event}}{\text{number of times classification of audio frame is performed for period } t3} \geq T_d \quad (4)$$

Figure 10:
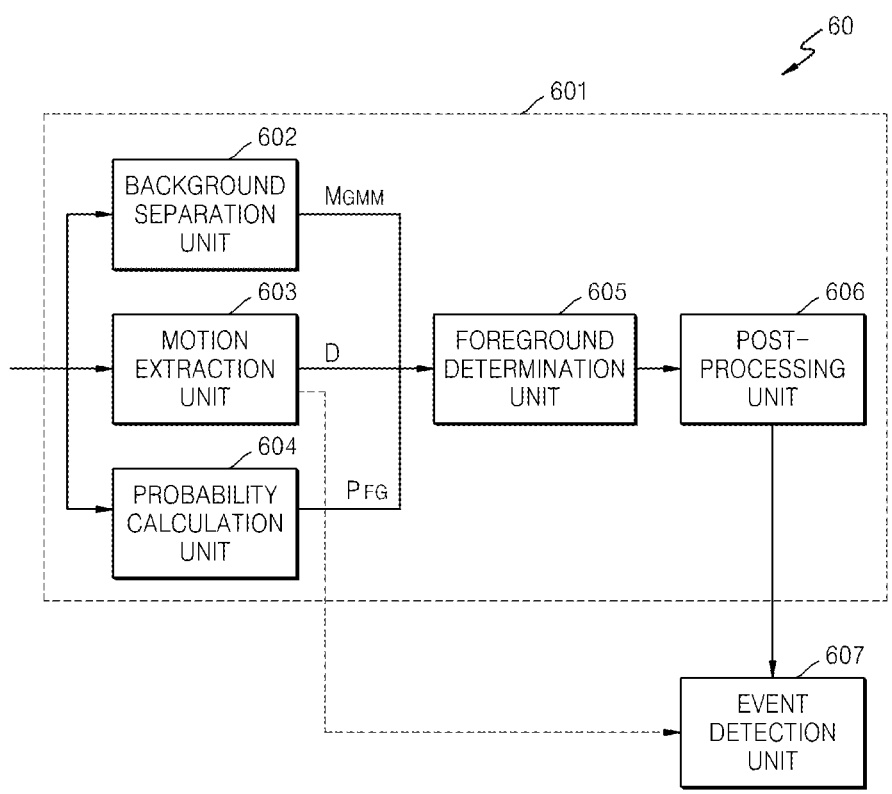
FIG. 10 is a block diagram of a video processing device included in the indoor surveillance system illustrated in FIG. 1, according to an exemplary embodiment.
Figure 11:
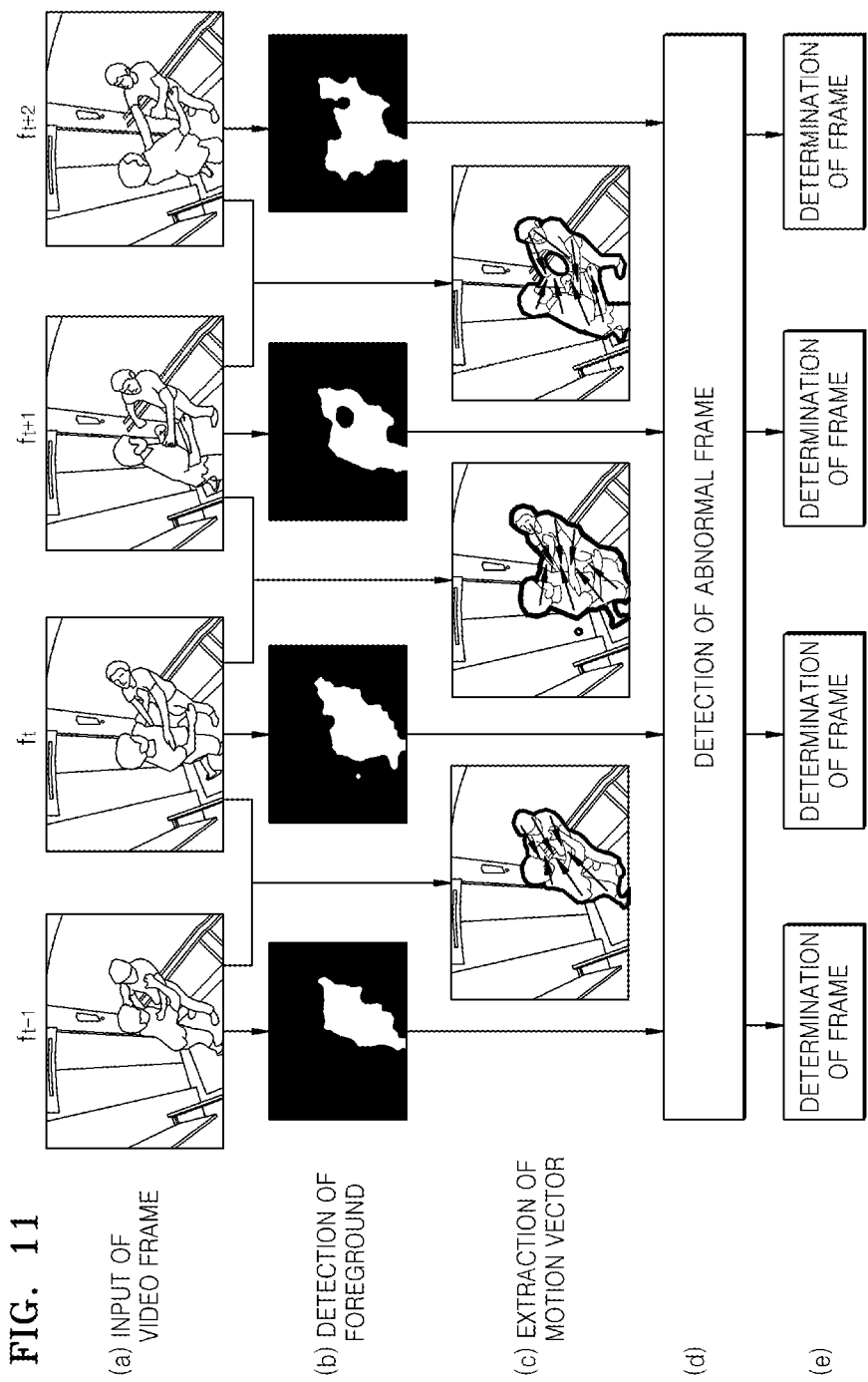
FIGS. 11 and 12 are flowcharts of an operation of the video processing device illustrated in FIG. 10 according to an exemplary embodiment.
Figure 12:
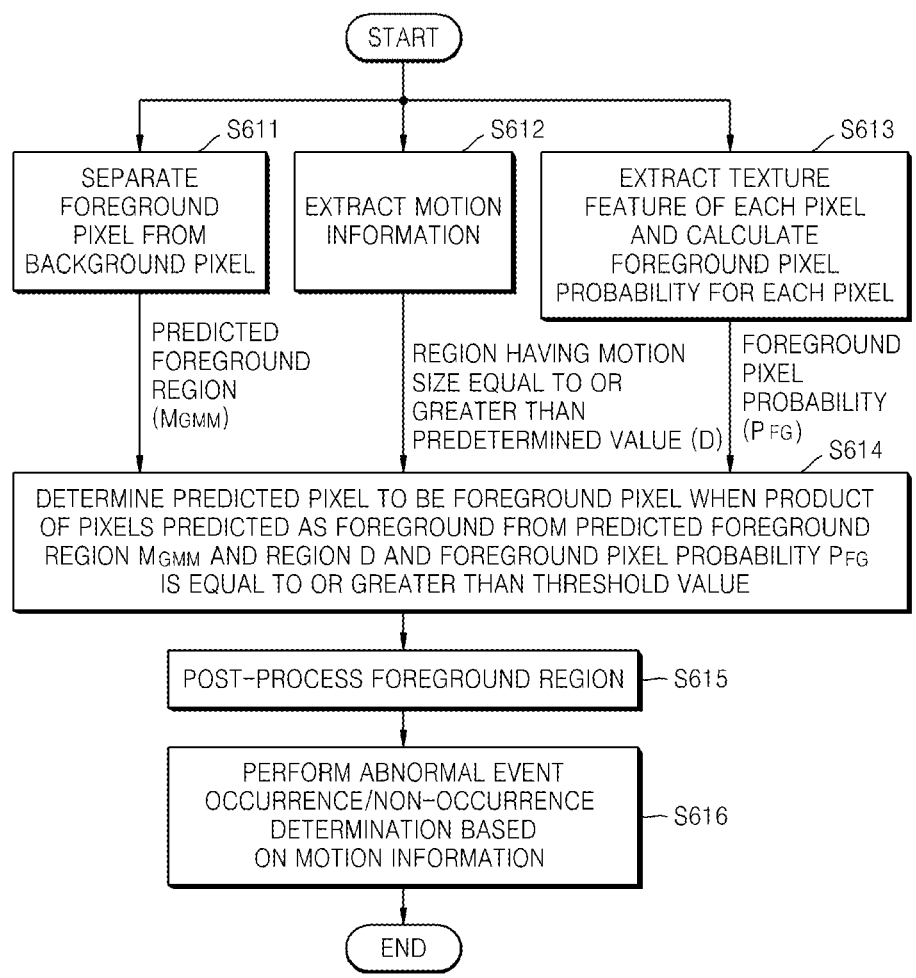

FIG. 10 is a block diagram of the video processing device 60 of FIG. 1, according to an exemplary embodiment. FIGS. 11 and 12 are flowcharts of an operation of the video processing device 60 illustrated in FIG. 10, according to an exemplary embodiment.

When the video processing device 60 receives a video frame as illustrated in FIG. 11(a), it detects a foreground region from each video frame as illustrated in FIG. 11(b). The video processing device 60 detects a motion change between adjacent video frames to extract a motion vector, as illustrated in FIG. 11(c). Next, the video processing device 60 determines whether an abnormal event has occurred, by analyzing a behavior in the foreground region, as illustrated in FIG. 11(d), and outputs a result of the determination for each video frame as illustrated in FIG. 11(e).

Referring to FIG. 10, the video processing device 60 includes a foreground detection unit 601 and an event detection unit 607.

The foreground detection unit 601 predicts a foreground pixel based on foreground region information and motion information extracted from a video frame, and performs validation on a predicted foreground pixel based on a texture feature, in order to extract a foreground region (hereinafter, referred to as a foreground binary large object (BLOB)). The foreground detection unit 601 includes a background separation unit 602, a motion extraction unit 603, a probability calculation unit 604, a foreground determination unit 605, and a post-processing unit 606.

Figure 13:
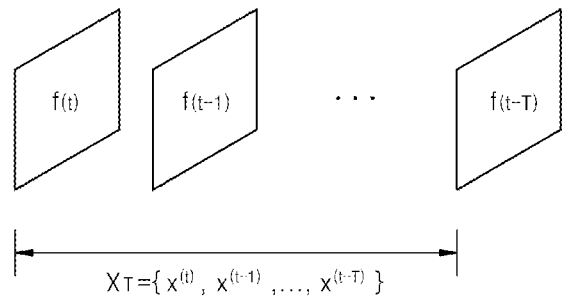
FIG. 13 is a diagram for explaining a background separating method according to an exemplary embodiment.

Referring to FIG. 12, in operation S611, the background separation unit 602 extracts the foreground region information from the video frame based on a background subtraction algorithm, for example, GMM. When video frames are consecutively input for a period T, as illustrated in FIG. 13, the background separation unit 602 models a value of an arbitrary pixel by using a mixture model formed of M Gaussian distributions and separates a foreground pixel from a background pixel by using the modeled pixel value.

If an arbitrary pixel value x measured at an arbitrary time t from each of consecutive video frames follows a Gaussian mixture distribution formed of M Gaussian distributions, the Gaussian mixture distribution may be expressed as Equation (5) below, where p denotes a probability, x denotes a pixel value, BG denotes a pixel likely to be a background, FG denotes a pixel likely to be a foreground, $\mu_m$ and $\sigma_m^2$ denote a mean and a covariance matrix, respectively, of an m-th Gaussian distribution, and $\pi_m$ denotes a weighted value of the m-th Gaussian distribution. $X_T (= \{x^{(t)}, x^{(t-1)}, \ldots, x^{(t-T)}\})$ is a set of pixel values in video frames f received for the period T, as illustrated in FIG. 13.

$$p(\vec{x} \mid X_T, BG + FG) = \sum_{m=1}^{M} \pi_m N(\vec{x}, \hat{\vec{\mu}}_m, \hat{\sigma}_m^2 I) \quad (5)$$

A new video frame is input at a next time (t+1), and, accordingly if given a new pixel value, the Gaussian mixture distribution is recursively updated according Expressions (6) through (8):

$$\hat{\pi}_m \leftarrow \hat{\pi}_m + \alpha(o_m^{(t)} - \hat{\pi}_m) \quad (6)$$

$$\vec{\mu}_m \leftarrow \vec{\mu}_m + o_m^{(t)}(\alpha/\hat{\pi}_m)\vec{\delta}_m \quad (7)$$

$$\hat{\sigma}_m^2 \leftarrow \hat{\sigma}_m^2 + o_m^{(t)}(\alpha/\hat{\pi}_m)(\vec{\delta}_m^T \vec{\delta}_m - \hat{\sigma}_m^2) \quad (8)$$

where $\delta_m = x^{(t)} - \mu_m$, $\alpha$ denotes a designated-by-user learning parameter, and $o_m$ has a value of 1 when an input pixel value is closest to a distribution m and has a value of 0 when the input pixel value is closer to another distribution. A Gaussian distribution corresponding to a background has a large weighted value and a small variance value, compared to a Gaussian distribution corresponding to a foreground, and by using that, respective weighted values of the M Gaussian distributions are arranged in a descending order, and then B Gaussian distributions that satisfy Equation (9) (where T denotes a threshold value) are determined as Gaussian distributions corresponding to a background. A distribution finally corresponding to a background is expressed as Equation (10).

$$B = \operatorname*{argmin}_{b}\left(\sum_{m=1}^{b} \hat{\pi}_m > T\right) \quad (9)$$

$$p(\vec{x} \mid X_T, BG) \cong \sum_{m=1}^{B} \hat{\pi}_m N(x \mid \hat{\vec{\mu}}_m, \sigma_m^2 I) \quad (10)$$

In operation S612, the motion extraction unit 603 extracts motion information from each pixel by calculating an optical flow from consecutive video frames. The motion information is a motion vector extracted using such as the Lucas-Kanade method, and includes a motion size and a motion direction.

In operation S613, the probability calculation unit 604 extracts a texture feature of each pixel by using a correlation between a reference background frame and an input video frame, and calculates a foreground pixel probability for each pixel from a texture feature histogram. The foreground pixel probability is a probability that a pixel is included in a foreground. By using a texture feature, the current exemplary embodiments are strong against illumination changes.

Figure 14:
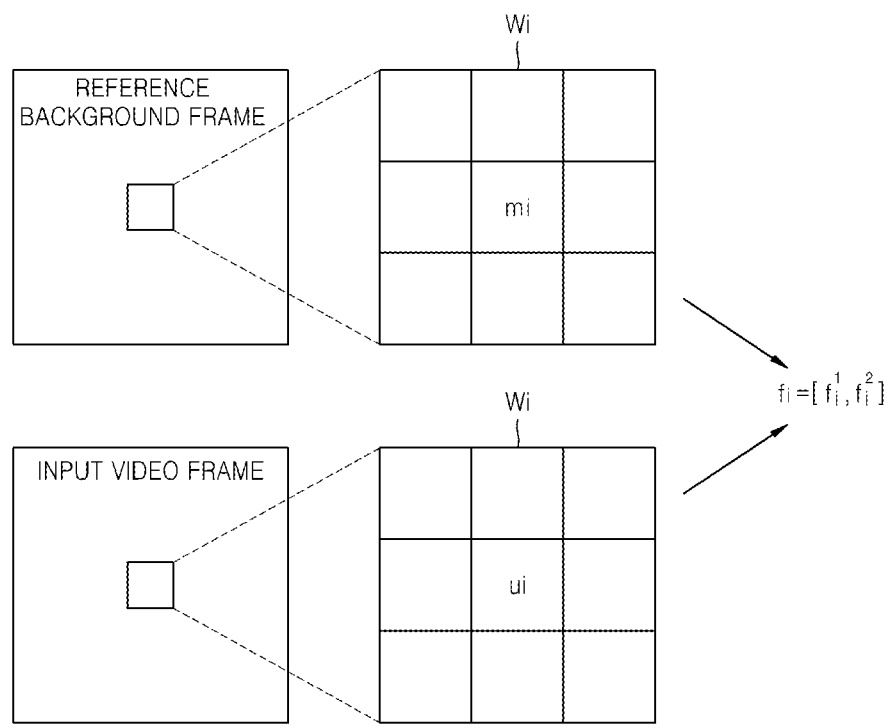
FIG. 14 is a diagram for explaining a method of extracting a texture feature, according to an exemplary embodiment.

As illustrated in FIG. 14, the probability calculation unit 604 extracts a first feature $f_i^1$ and a second feature $f_i^2$ corresponding to the texture features of a pixel i, based on the correlation between the input video frame and the reference background frame and a difference between the values of the pixel i and neighboring pixels. The first feature $f_i^1$ is a normalized cross correlation (NCC) between the input video frame and the reference background frame. The second feature $f_i^2$ is a texture value.

When the value of the pixel i of the reference background frame and that of the input video frame are $m_i$ and $u_i$, respectively, the texture feature $f_i = [f_i^1 \ f_i^2]$ of the pixel i is defined as Equations (11) and (12), where $\omega$ denotes a set of pixels adjacent to the pixel i, $\bar{u}$ denotes a mean of the pixels adjacent to the pixel i in the input video frame, $\bar{m}$ denotes a mean of the pixels adjacent to the pixel i in the reference background frame.

$$f_i^1 = \frac{\sum_{j \in \omega_i}(u_j - \bar{u}_i)(m_j - \bar{m}_i)}{\sqrt{\sum_{j \in \omega_i}(u_j - \bar{u}_i)^2 \sum_{j \in \omega_i}(m_j - \bar{m}_i)^2}} \quad (11)$$

$$f_i^2 = \sqrt{\sum_{j \in \omega_i}(u_j - \bar{u}_i)^2} + \sqrt{\sum_{j \in \omega_i}(m_j - \bar{m}_i)^2} \quad (12)$$

Figure 15A:
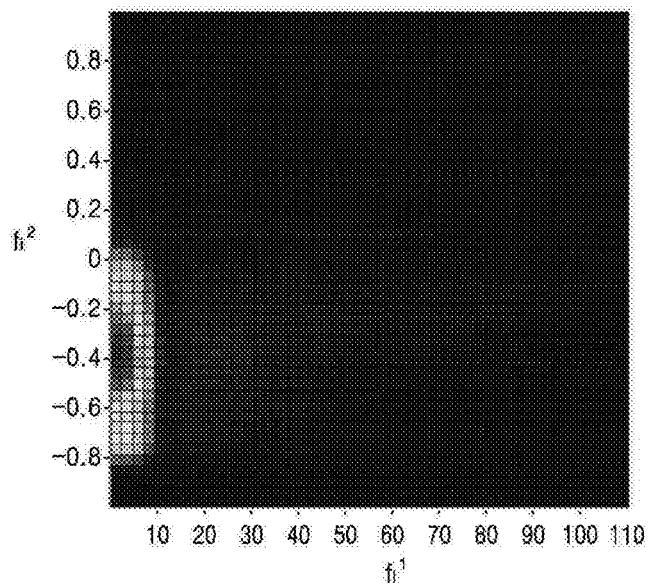
FIGS. 15A and 15B illustrate a foreground texture feature histogram and a background texture feature histogram, respectively, generated according to an exemplary embodiment.
Figure 15B:
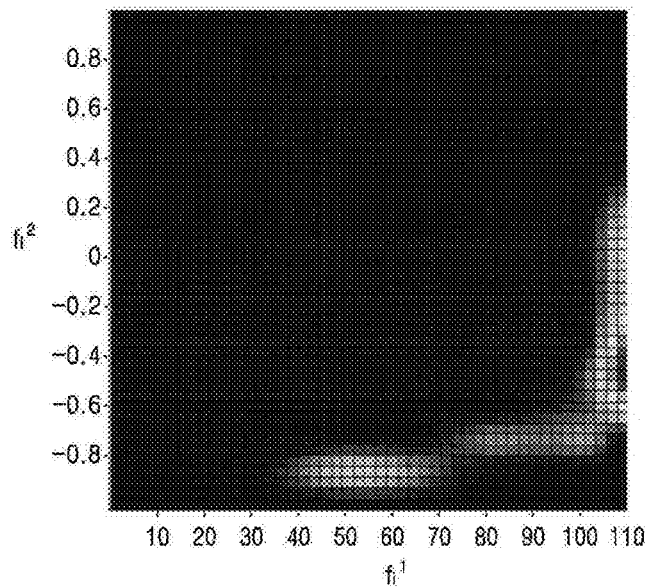

The texture feature histogram is a foreground and background probability model generated by using a spatial likelihood model (SLM) based on texture information. A probability model may inspect the validity of a pixel detected as a foreground, because it considers the dependency between pixels. After a texture feature is extracted from each pixel by training a video frame of the monitoring region, a background texture feature histogram $h_{BG}(f_i|x_i)$ and a foreground texture feature histogram $h_{FG}(f_i|x_i)$ are calculated. FIGS. 15A and 15B are a foreground texture feature histogram and a background texture feature histogram, respectively, generated according to an exemplary embodiment.

The probability calculation unit 604 calculates a foreground pixel probability for each pixel, based on the texture feature extracted from each pixel of the input frame, by using the foreground texture feature histogram and the background texture feature histogram.

Since a texture feature histogram generated by training is limited to only a specific environment, the probability calculation unit 604 updates the texture feature histogram by using a result of final separation between a foreground and a background in order to react to various environments, according to Equations (13) and (14) where $\alpha_{BG}$ and $\alpha_{FG}$ denote respective SLM learning rates of the foreground texture feature histogram and the background texture feature histogram, respectively, and $b_1$ denotes a bin of a histogram. An SLM learning may be an online or offline SLM learning. An online SLM learning of updating a texture feature histogram by using a result of final separation between a foreground and a background is easy to adapt to a new foreground, compared to an offline SLM learning of separating a foreground from a background by manually capturing a monitoring region.

$$h_{BG}(b_1) = \alpha_{BG} \cdot h_{BG}(b_1) + (1 - \alpha_{BG}) \cdot h^*_{BG}(b_1) \quad (13)$$

$$h_{FG}(b_1) = \alpha_{FG} \cdot h_{FG}(b_1) + (1 - \alpha_{FG}) \cdot h^*_{FG}(b_1) \quad (14)$$

In operation S614, the foreground determination unit 605 determines a foreground region by fusing the foreground region information received from the background separation unit 602, the motion information received from the motion extraction unit 603, and the foreground pixel probability received from the probability calculation unit 604.

The foreground determination unit 605 obtains all pixels predicted as a foreground, by performing an OR operation on a foreground region detected using the GMM and a region detected using motion information calculated using an optical flow. Moreover, the foreground determination unit 605 compares a foreground pixel probability $p_{FG}$ for the pixel predicted as a foreground with a threshold value, and determines the predicted pixel to be a foreground pixel if the product is equal to or greater than the threshold value, in operation S614. Equation (15) expresses a method of detecting a foreground region by information fusion.

$$M_{i,motion} = \begin{cases} 1 & \text{if } (M_{i,GMM} \vee D_i) \cdot p_{FG}(f_i | x_i) \geq T_m \\ 0 & \text{otherwise} \end{cases} \quad (15)$$

where $M_{GMM}$ denotes the foreground region obtained using the GMM, D denotes a region in which a motion size of a motion vector obtained using an optical flow is equal to or greater than a reference value, and $T_m$ denotes the threshold value. V denotes a logic OR operator.

The foreground determination unit 605 may detect a final foreground region $M_{final}^{(t)}$ from a current input video frame by using foreground region information of a previous input video frame as in Equation (16) in order to reduce an error of non-detection of an object with a small motion.

$$M_{i,final}^{(t)} = \begin{cases} 1 & \text{if } [(1-\lambda)M_{i,motion}^{(t)} + \lambda M_{i,final}^{(t-1)}] \cdot p_{FG}(f_i | x_i) \geq T_b \\ 0 & \text{otherwise} \end{cases} \quad (16)$$

where $M_{motion}^{(t)}$ denotes a foreground region detected from the current input video frame in which information about the previous input video frame is not reflected, and $M_{final}^{(t-1)}$ denotes a final foreground region detected from the previous input video frame. $\lambda$ denotes a mixed weight value. As $\lambda$ approaches 1, a foreground probability is calculated by more reflecting the information about the previous input video frame. A final foreground probability is calculated by multiplying the foreground probability by values obtained by applying a weighted value to respective pixels predicted as a foreground on the previous and current input video frames. If the final foreground probability is equal to or greater than a threshold value $T_b$, the pixel predicted as a foreground is determined to be a foreground pixel.

According to an exemplary embodiment, object region detection strong against an environment of a monitoring region may be obtained by further fusing texture feature information, motion information, and previous frame information in addition to the GMM technique.

In operation S615, the post-processing unit 606 may remove noise by post-processing the foreground region. The post-processing unit 606 may further use a morphological image processing method to remove white noise or the like. The post-processing unit 606 may increase the accuracy of foreground region detection by removing a reflector generated by a reflective surface from the foreground region. For example, when a reflective surface exists as in the inside of an elevator, a foreground region not overlapping a bottom surface is removed using a bottom surface model.

In operation S616, the event detection unit 607 performs an abnormal event occurrence/non-occurrence determination in units of video frames, based on motion information of the finally determined foreground region (hereinafter, referred to as a 'foreground BLOB'). If the number of times an abnormal event has occurred for a certain period of time is equal to or greater than a threshold value, it is determined that an abnormal event has occurred. Motion information used for event detection is motion information of the foreground BLOB. When a motion vector of only the detected foreground region of a video frame is used, a computational cost may be reduced and the reliability of extracted motion information may be increased, compared to when a motion vector of the entire region of the video frame is used.

Motion information is calculated from motion vectors for a horizontal component and a vertical component extracted in the motion extraction unit 603 by using such as the Lucas-Kanade method. Equation (17) calculates a motion size of the foreground BLOB, and Equation (18) calculates a motion direction of the foreground BLOB. Equation (19) is a histogram of motion directions in the foreground BLOB.

$$M_{mag}(x) = \sqrt{V_{hori}^2(x) + V_{vert}^2(x)}, \quad x \in R_{FG} \quad (17)$$

$$M_{phase}(x) = \tan^{-1}\left(\frac{V_{vert}(x)}{V_{hori}(x)}\right), \quad x \in R_{FG} \quad (18)$$

$$H(i) = \sum_{x \in R_{FG}} I(Q_{phase}(x) = D(i)) \quad (19)$$

Figure 16:
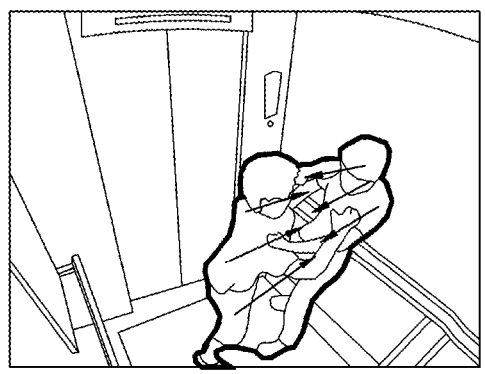
FIG. 16 is a view showing motion vectors extracted from a foreground binary large object (BLOB) according to an exemplary embodiment.

FIG. 16 is a view showing motion vectors extracted from a foreground BLOB according to an exemplary embodiment. Referring to FIG. 16, a region surrounded with a bold line is a detected foreground BLOB, and arrows in the foreground BLOB indicate motion vectors.

Figure 17:
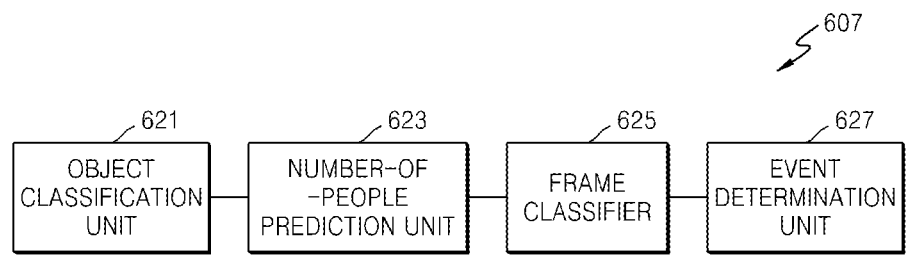
FIG. 17 is a block diagram of an event detection unit of the video processing device of FIG. 10, according to an exemplary embodiment.
Figure 19A:
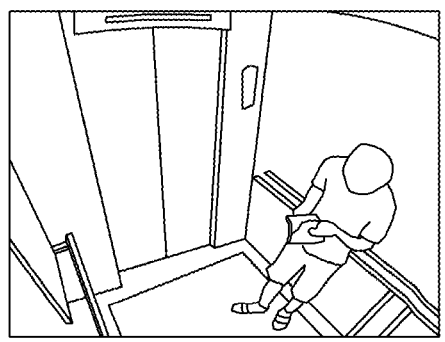
FIGS. 19A, 19B, 19C, and 19D illustrate an original video frame, a foreground video frame detected from the original video frame, a horizontal projection extracted from the foreground video frame, and a vertical projection extracted from the foreground video frame, respectively, according to exemplary embodiments.
Figure 19B:
Figure 19C:
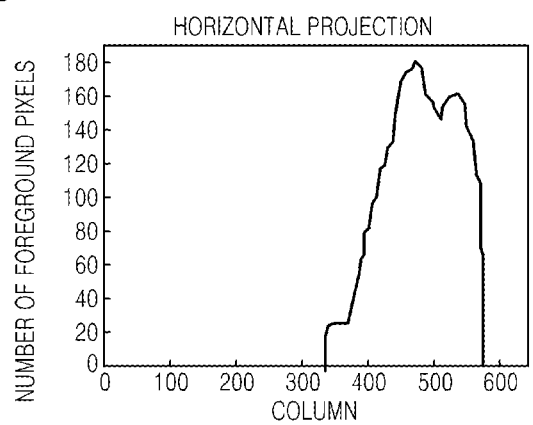
Figure 19D:
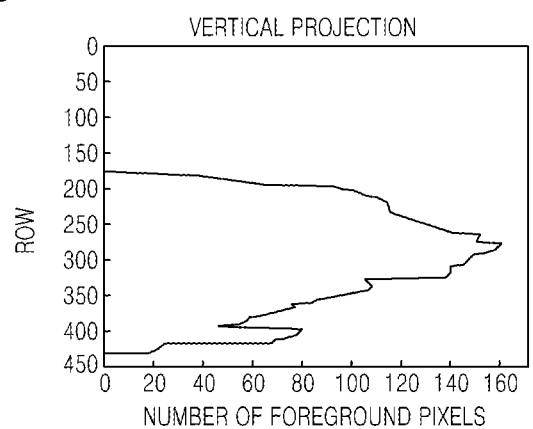

FIG. 17 is a block diagram of the event detection unit 607 of the video processing device 60, according to an exemplary embodiment. FIG. 18 is a flowchart of an operation of the event detection unit 607 illustrated in FIG. 17, according to an exemplary embodiment.

Referring to FIG. 17, the event detection unit 607 includes an object classification unit 621, a number-of-people prediction unit 623, a frame classifier 625, and an event determination unit 627.

In operation S631, the object classification unit 621 determines whether an object in the foreground BLOB is a human being, based on information about a size and location of the foreground BLOB. A foreground BLOB that has a very small size or is detected at a place where people cannot be is not determined to be a human being. In operation S632, the object classification unit 621 determines whether a foreground BLOB determined to be a human being is a group of people or an individual person, based on a statistical feature of the foreground BLOB. The statistical feature represents a shape and location of the foreground BLOB. In the current exemplary embodiments, first through thirteenth parameters P1 through P13 that provide distinct geometric information such as coordinates of a BLOB, a width thereof, and a height of a BLOB box may be used as the statistical feature as in Equation 20, where $$P_H(j) = \sum_{i=1}^{N} I(i, j)$$

denotes horizontal projection, $$P_V(i) = \sum_{j=1}^{M} I(i, j)$$

denotes vertical projection, I denotes a binary foreground video frame, N denotes the number of rows of a video frame, M denotes the number of columns of the video frame, K denotes the number of rows having values that are not 0, and L denotes the number of columns having values that are not 0.

$$P_1 = \frac{1}{N} \max_{j=1,\ldots,M} P_H(j), \quad P_2 = \frac{1}{M} \max_{i=1,\ldots,N} P_V(i), \quad (20)$$

$$P_3 = \frac{1}{NM} \sum_{j=1}^{M} \sum_{i=1}^{N} I(i, j), \quad P_4 = \frac{1}{M} \min_{j=1,\ldots,M} \{P_H(j) \neq 0\},$$

$$P_5 = \frac{1}{M} \max_{j=1,\ldots,M} \{P_H(j) \neq 0\},$$

$$P_6 = \frac{1}{M}\left[\max_{j=1,\ldots,M}\{P_H(j) \neq 0\} - \min_{j=1,\ldots,M}\{P_H(j) \neq 0\}\right],$$

$$P_7 = \frac{1}{N} \min_{i=1,\ldots,N} \{P_V(i) \neq 0\}, \quad P_8 = \frac{1}{N} \max_{i=1,\ldots,N} \{P_V(i) \neq 0\},$$

$$P_9 = \frac{1}{N}\left[\max_{j=1,\ldots,N}\{P_V(i) \neq 0\} - \min_{j=1,\ldots,N}\{P_V(i) \neq 0\}\right],$$

$$P_{10} = \frac{1}{K} \sum_{j=1}^{M} P_H(j), \quad P_{11} = \frac{1}{L} \sum_{i=1}^{N} P_V(j)$$

$$P_{12} = \sum_{j=1}^{M} \left| P_H(j) - \frac{1}{K} \sum_{j=1}^{M} P_H(j) \right|,$$

$$P_{13} = \sum_{i=1}^{N} \left| P_V(i) - \frac{1}{L} \sum_{i=1}^{N} P_V(i) \right|$$

FIGS. 19A, 19B, 19C, and 19D illustrate an original video frame, a foreground video frame detected from the original video frame, a horizontal projection extracted from the foreground video frame, and a vertical projection extracted from the foreground video frame, respectively. The location and shape of a foreground BLOB may be ascertained based on the horizontal projection of FIG. 19C and the vertical projection of FIG. 19D.

The object classification unit 621 determines whether the foreground BLOB determined to be a human being is a group of people or an individual person, by comparing a statistical feature extracted from the foreground BLOB with statistical information about an individual object and a group object via the AdaBoost training method or the like.

In operation S635, the number-of-people prediction unit 623 may predict the number of people in the monitoring region by using the number of foreground BLOBs, an object classification result, and the like. The number of people is predicted per video frame, and a histogram in which the numbers of people predicted for video frames are accumulated is used. Since an abnormal event is likely to occur when two or more people are in the monitoring region, it is more important to find a case where there are two or more people than to predict the exact number of people, and thus, it is assumed that a foreground BLOB determined to be a group includes two people.

Figure 20:
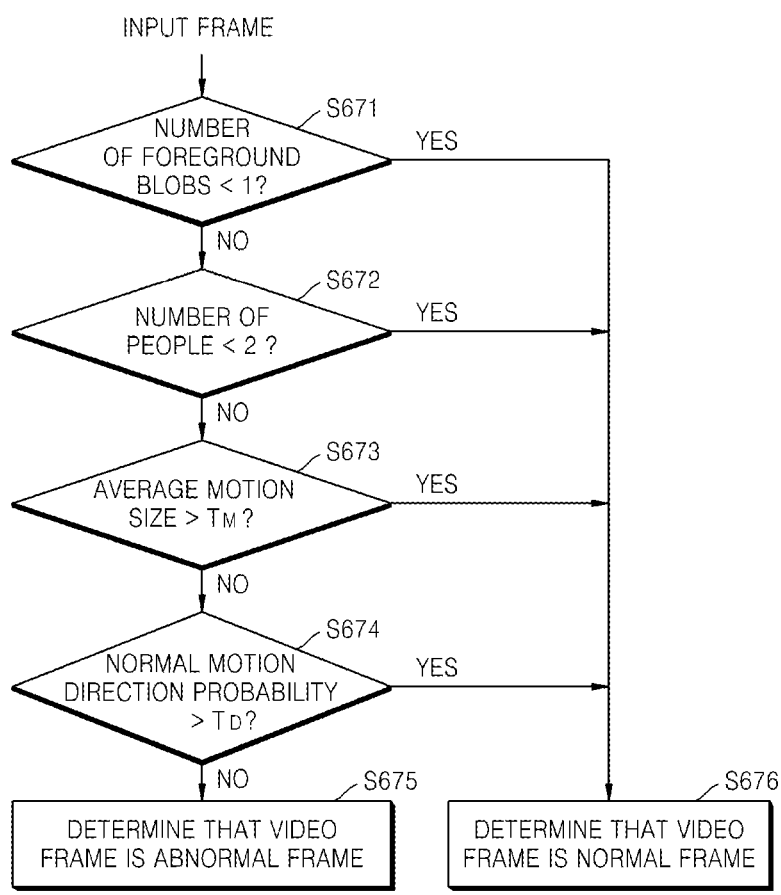
FIG. 20 is a flowchart of an operation of a frame classifier of the event detection unit of FIG. 17, according to an exemplary embodiment.

In operation S637, the frame classifier 625 determines whether a video frame is an abnormal frame, based on the number of foreground BLOBs, the number of people in the monitoring region, and motion information. The determination is performed in units of video frames. An abnormal frame is a frame representing an abnormal event. The abnormal event is defined as fighting between two people. FIG. 20 is a flowchart of an operation of the frame classifier 625, according to an exemplary embodiment.

Referring to FIG. 20, the frame classifier 625 determines whether the number of foreground BLOBs is less than 1, in operation S671. If the number of foreground BLOBs is less than 1, it is determined that a video frame from which no foreground BLOBs are detected is a normal frame, in operation S676. Accordingly, in an example of an elevator to be described later, a video frame of an empty elevator may be classified into a normal frame.

Next, in operation S672, when the number of foreground BLOBs is equal to or greater than 1, the frame classifier 625 determines whether the number of people is less than 2. If the number of people is less than 2, the frame classifier 625 determines whether the video frame is a normal frame, in operation S676.

On the other hand, if the number of people is equal to or greater than 2, the frame classifier 625 determines whether a mean of motion sizes in the foreground BLOB (hereinafter, referred to as an average motion size Mavg) is less than a threshold value $T_M$, in operation S673. If the average motion size Mavg is less than the threshold value $T_M$, the frame classifier 625 determines that the video frame is a normal frame, in operation S676. Since an abnormal event accompanies a big motion of a person, a big motion occurs in the abnormal event. Accordingly, a frame in which the average motion size Mavg of the foreground BLOB is less than the threshold value $T_M$ may be classified into a normal frame. The threshold value $T_M$ may be set differently according to monitoring regions. For example, in the example of an elevator to be described later, the threshold value $T_M$ may be set differently depending on the type of elevator. In other words, abnormal frame performance may be controlled since a motion limit is variable.

Finally, the frame classifier 625 determines the degree of consistency between motion directions. In general, in normal situations, directions of motions are consistent according to directions in which people move. For example, in the example of an elevator to be described later, many motions occur in a general situation where the door is open, because people make motions while getting on or getting off the elevator. However, motions of getting on and getting off the elevator have consistent directionality according to directions in which people move. However, a motion generated by assault or kidnapping has inconsistent directionality. Accordingly, if the average motion size Mavg of the foreground BLOB is equal to or greater than the threshold value $T_M$, an abnormal frame determination unit 624 determines whether a probability $P_{ori}$ that a motion direction in the foreground BLOB belongs to a motion direction range of a reference normal situation is greater than a threshold value $T_D$, in operation S674. If the probability $P_{ori}$ is greater than the threshold value $T_D$, the frame classifier 625 classifies the video frame into a normal frame, in operation S676. On the other hand, when the probability $P_{ori}$ is less than or equal to the threshold value $T_D$, the frame classifier 625 classifies the video frame into an abnormal frame, in operation S675.

A motion size m and a motion direction θ of a foreground BLOB are expressed as Equations (21) and (22), respectively, where (x,y) denotes the location of a pixel in the foreground BLOB, and Vx and Vy denote a horizontal speed component and a vertical speed component, respectively, in an optical flow:

$$m(x, y) = \sqrt{V_x(x, y)^2 + V_y(x, y)^2} \quad (21)$$

$$\theta(x, y) = \arctan\left(\frac{V_y(x, y)}{V_x(x, y)}\right) \quad (22)$$

The average motion size Mavg of the foreground BLOB is expressed as Equation (23), where $R_B$ denotes a foreground BLOB of each frame and $N(R_B)$ denotes the number of pixels in the foreground BLOB.

$$M_{avg} = \frac{\sum_{(x,y) \in R_B} m(x, y)}{N(R_B)} \quad (23)$$

The probability $P_{ori}$ that the motion direction of a foreground BLOB belongs to the motion direction range of a normal situation is expressed as Equation (24), where $O_{avg}$ denotes an average direction, $O_{std}$ denotes a standard deviation, and s(●) denotes a comparison function.

$$P_{ori} = \frac{\sum_{(x,y) \in R_B} s(O_{avg} - O_{std} \leq \theta(x, y) \leq O_{avg} + O_{std})}{N(R_B)} \quad (24)$$

Referring back to FIG. 18, in operation S639, the event determination unit 627 determines whether an abnormal event has occurred, by accumulating results of the frame classifications performed by the frame classifier 625. The determination as to whether an abnormal event has occurred is expressed as Equation (25), where $D_n$ denotes an abnormal event when a final detection result in an n-th frame is 1, and denotes a normal event when the final detection result in the n-th frame is 0. $B_n$ denotes an abnormal frame when a result of detection of an abnormal frame is 1, and denotes a normal frame when the result of detection of an abnormal frame is 0. $Ti_D$ is a time parameter that denotes the number of frames from a present point in time to a predetermined past point in time. $T_E$ is a sensitivity parameter that ranges from 0 to 1. The event determination unit 627 determines that an abnormal event has occurred, when the number of times an abnormal frame has occurred over the time parameter $Ti_D$ is greater than a threshold value $T_E$.

$$D_n = \begin{cases} 1, & \text{if } \frac{1}{Ti_D} \sum_{n-Ti_D}^{n} B_n > T_E \\ 0, & \text{otherwise} \end{cases} \quad (25)$$

Figure 21:
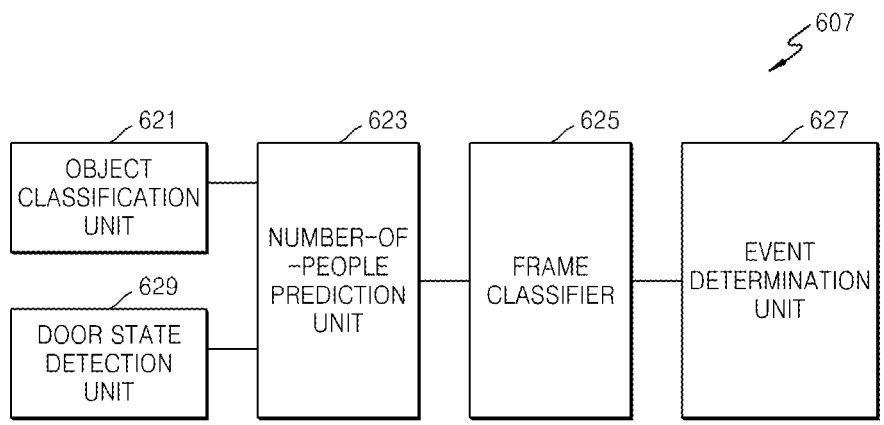
FIG. 21 is a block diagram of an event detection unit of the video processing device of FIG. 10, according to another exemplary embodiment.

FIG. 21 is a block diagram of an event detection unit 607 of the video processing device 60 of FIG. 1, according to another exemplary embodiment. FIG. 22 is a flowchart of an operation of the event detection unit 607 of FIG. 21, according to an exemplary embodiment.

The event detection unit 607 of FIG. 21 is different from the event detection unit 607 of FIG. 17 in that a door state detection unit 629 is further included. Since functions and operations of the other components of the event detection unit 607 of FIG. 21 are the same as those of FIG. 17, repeated detailed descriptions are omitted. The event detection unit 607 of FIG. 17 may be applied to places where there are no doors, such as a corridor, or indoor surveillance systems in which a door is not an important variable. The event detection unit 607 of FIG. 21 may be applied to indoor surveillance systems in which an open/close state of a door is an important variable. In elevators, many shadows and reflectors are generated by wall surfaces, and inside illumination severely changes as the door is opened and closed frequently. Accordingly, reflector removal and door state detection are needed. An example in which the event detection unit 607 of FIG. 21 is applied to an elevator will now be described.

Referring to FIG. 21, the event detection unit 607 includes an object classification unit 621, a number-of-people prediction unit 623, a frame classifier 625, an event determination unit 627, and the door state detection unit 629.

In operation S651, the object classification unit 621 determines whether an object in the foreground BLOB is a human being, based on information about a size and location of the foreground BLOB. In operation S652, the object classification unit 621 determines whether a foreground BLOB determined to be a human being is a group of people or an individual person, based on a statistical feature of the foreground BLOB (e.g., information about a shape and location of the foreground BLOB).

In operation S653, the door state detection unit 629 determines opening or closing of the door by using information about the locations of the door and the floor ascertained during calibration of a camera and based on the number of foreground pixels included in an upper region corresponding to ⅓ of the entire region of the door according to Equation (26), where $S_n$ denotes opening of the door when a result of a door state detection performed on an n-th frame is 1, and denotes closing of the door when the result of the door state detection performed on the n-th frame is 0. $R_D$ denotes the upper region corresponding to ⅓ of the entire region of the door, and $\Sigma_{i \in R_D} i$ denotes the number of pixels included in the upper region $R_D$. $T_s$ denotes a threshold value for door state determination.

$$S_n = \begin{cases} 1, & \text{if } \dfrac{\sum_{i \in R_D} s(h_{FG}(i) - T_F)}{\sum_{i \in R_D} i} \geq T_S \\ 0, & \text{otherwise} \end{cases} \quad (26)$$

S(x) is a comparison function, where x denotes a difference between a foreground pixel probability $h_{FG}$ and a threshold value $T_F$. A value of the comparison function S(x) is calculated using Equation (27):

$$s(x) = \begin{cases} 1, & x > 0 \\ 0, & x \leq 0 \end{cases} \quad (27)$$

Figure 23A:
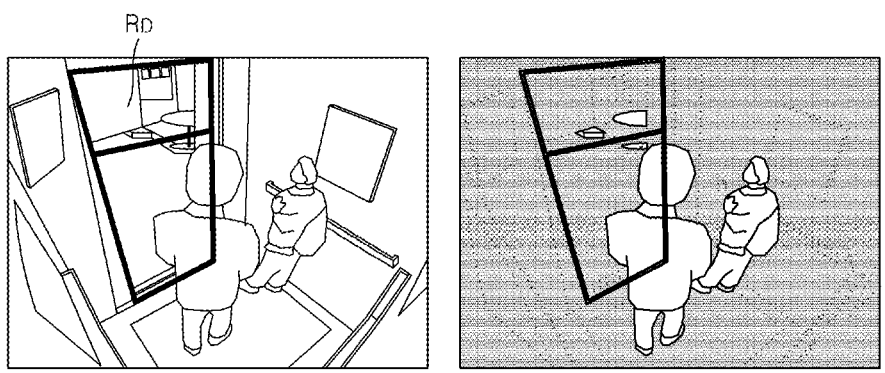
FIGS. 23A and 23B illustrate an upper region corresponding to ⅓ of the region of a door in a door-opened state and that in a door-closed state, respectively, according to an exemplary embodiment.
Figure 23B:
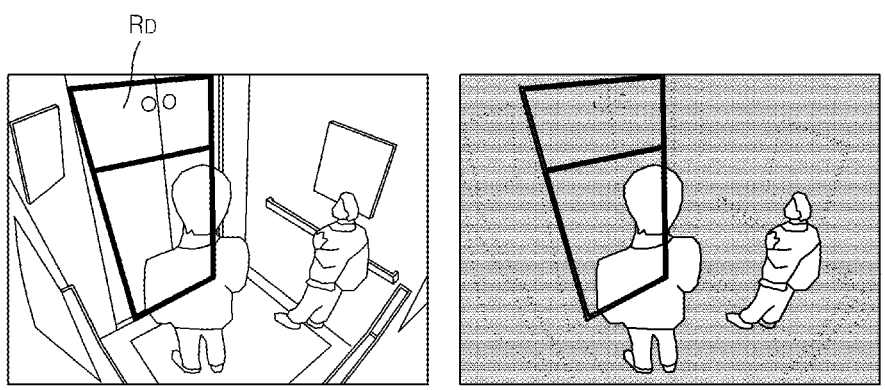

FIGS. 23A and 23B illustrate the upper region $R_D$ corresponding to ⅓ of the entire region of a door when the door is opened and when the door is closed, respectively, according to an embodiment. Respective left images in FIGS. 23A and 23B are original video frames, and respective right images therein show results of door state detections.

In operation S655, the number-of-people prediction unit 623 may predict the number of people in the elevator by using the number of foreground BLOBs, an object classification result, a result of door state detection, and the like. The number of people is predicted for each of frames obtained from a door-opened point in time to a present point in time, and a histogram showing an accumulation of the results of the predictions is used. Since it is important to find an event having 2 or more people riding on the elevator, which is likely to be an abnormal event, criteria applied to the prediction of the number of people are simplified to 0, 1, 2, and 3. At the moment when the door is opened, a current histogram is initialized, and a new histogram is generated. The predicted number of people $P_n$ in an n-th frame may be obtained using Equation (28). When the door is opened, an index having a highest value in a histogram $H_n$ is simply selected as the predicted number of people $P_n$. However, when the door is closed, the number of people in the elevator cannot be changed, and thus, an index $x_c$ having the highest histogram value at the moment when the door is closed is selected as the predicted number of people $P_n$. However, when the index $x_c$ is a wrongly predicted value and the histogram value of a newly predicted index is greater than that of the index $x_c$ by at least a certain percentage, the predicted number of people $P_n$ is updated even when the door is closed. A method of predicting the number of people per frame and a method of updating a histogram via the predicted number of people may be expressed as Equations (29) and (30), respectively, where $\alpha_p$ denotes a weighted value parameter having a value greater than 1, $I_n$ and $G_n$ denote the number of individual objects and the number of group objects, respectively, in the n-th frame, and $C_n$ denotes the number of people predicted from a foreground BLOB.

$$P_n = \begin{cases} x_c, & \text{if } S_n = 0 \text{ and } \alpha_p H_n(x_c) < \max\{H_n(x)\} \\ \arg\max_{x \in \{0,1,2,3\}} \{H_n(x)\}, & \text{otherwise} \end{cases} \quad (28)$$

$$H_n(x) = \begin{cases} H_{n-1}(x) + 1, & \text{if } C_n = x \\ H_{n-1}(x), & \text{otherwise} \end{cases} \quad (29)$$

$$C_n = \begin{cases} I_n + 2G_n, & \text{if } C_n \leq 3 \\ 3, & \text{otherwise} \end{cases} \quad (30)$$

In operation S657, the frame classifier 625 determines whether a video frame is an abnormal frame, based on the number of foreground BLOBs, the number of people in the monitoring region, and motion information. The determination is performed in units of frames. An abnormal frame is a frame representing an abnormal event. The abnormal event is defined as fighting between two people. An event where an elevator is empty, an event where people stand up in the elevator, or an event where people get on or get off the elevator is defined as a normal event. An operation of the frame classifier 625 is the same as the operation illustrated in FIG. 20, so a detailed description thereof is omitted.

In operation S659, the event determination unit 627 determines whether an abnormal event has occurred, by accumulating results of frame classifications performed by the frame classifier 625.

In the above-described exemplary embodiments, features of three levels are extracted from image data acquired to detect an abnormal event in an elevator. A low-level feature is extracted from an input image, like detection of an object region, extraction of a motion vector, and the like, and a mid-level feature, such as the number of people in an elevator and the moving direction and speed of the people, is extracted based on the extracted low-level feature. Finally, normal/abnormal frame information corresponding to a high-level feature is extracted based on the mid-level feature, and an abnormal event is detected according to the frequency of generation of an abnormal frame.

Up to now, the inventive concept has been described by referring to exemplary embodiments. While exemplary embodiments have been particularly shown and described, it will be understood by those of ordinary skill in the art that various changes in form and details may be made therein without departing from the spirit and scope of the inventive concept as defined by the appended claims. Therefore, the exemplary embodiments should be considered in descriptive sense only and not for purposes of limitation. Therefore, the scope of the inventive concept is defined not by the detailed description of exemplary embodiments, but by the appended claims, and all differences within the scope will be construed as being included in the inventive concept.

What is claimed is:

1. A surveillance system comprising at least one processor to implement:
   a foreground detection unit which predicts a foreground pixel based on foreground region information and motion information extracted from a video frame and performs validation on the predicted foreground pixel based on a texture feature so as to extract a foreground region; and
   an event detection unit which classifies the video frame based on the motion information, and determines whether an abnormal event has occurred in a monitoring region, based on results of classifications of a certain number of video frames,
   wherein the event detection unit comprises:
      an object classification unit which determines whether an object in the foreground region is a human being, based on information about a size and location of the foreground region, and classifies a foreground region determined to be a human being into a group of people or an individual person, based on information about a shape and location of the foreground region;
      a number-of-people prediction unit which predicts a number of people in the video frame based on a result of classification of the foreground region;
      a frame classifier which classifies the video frame based on a number of foreground regions, the number of people in the video frame, an average motion size of the foreground region, and a degree of consistency of motion directions in the foreground region; and
      an event determination unit which determines that an abnormal event has occurred in the monitoring region, if a ratio of a number of times an abnormal frame is classified among the certain number of video frames to a total number of times of the classifications is equal to and greater than a first threshold value.

2. The surveillance system of claim 1, wherein the foreground detection unit comprises:
   a background separation unit which predicts the foreground region from the video frame by separating a background pixel from a foreground pixel;
   a motion extraction unit which extracts a motion vector of each pixel from the video frame;
   a probability calculation unit which extracts a texture feature of each pixel by using a correlation between a reference background frame and the video frame, and calculates a foreground pixel probability for each pixel from a texture feature histogram; and
   a foreground determination unit which compares a foreground pixel probability of a pixel predicted as a foreground from the predicted foreground region and a region having a motion vector equal to or greater than a predetermined value with a threshold value, and determines the predicted pixel to be a foreground pixel if the foreground pixel probability is equal to or greater than the threshold value.

3. The surveillance system of claim 2, wherein the foreground detection unit adjusts the foreground pixel probability by using foreground region information of a previous video frame and determines, to be a foreground pixel, a pixel of which the adjusted foreground pixel probability is equal to or greater than the threshold value.

4. The surveillance system of claim 3, wherein a reflector is removed from the foreground region by using a bottom surface model of the monitoring region.

5. The surveillance system of claim 1, wherein the frame classifier classifies the video frame into the abnormal frame if the number of foreground regions in the video frame is equal to or greater than 1, the predicted number of people in the video frame is equal to or greater than 2, an average motion size of the foreground region is equal to or greater than a second threshold value, and the degree of consistency of the motion directions is less than or equal to a third threshold value.

6. The surveillance system of claim 1, wherein the at least one processor further implements a door state detection unit which detects a door-opened/closed state of the monitoring region, and
   wherein the number-of-people prediction unit predicts the number of people in consideration of the door-opened/closed state.

7. The surveillance system of claim 6, wherein the door state detection unit detects the door-opened/closed state based on a number of foreground pixels in an upper region of a door.

8. The surveillance system of claim 1, wherein the at least one processor further implements:
   an audio processing device which extracts an audio feature of an audio signal, and determines whether the abnormal event has occurred in the monitoring region, based on the audio feature; and
   a context awareness device which calculates an audio abnormal probability and a video abnormal probability by respectively accumulating results of abnormal event occurrence/non-occurrence determinations performed on audio signals and results of abnormal event occurrence/non-occurrence determinations performed on video frames for a certain period of time, and finally determines whether an abnormal situation has occurred in the monitoring region, by using respective combined probability distribution models for a normal situation and the abnormal situation.

9. The surveillance system of claim 8, wherein the audio processing device comprises:
   a feature extraction unit which generates an audio frame from the audio signal and extracts the audio feature from the audio frame;
   a probability estimation unit which calculates a likelihood between the extracted audio feature and each audio model, and selects an audio model having a highest likelihood;
   an audio classifier which classifies the audio frame according to a hierarchical approach method; and
   an event determination unit which determines that the abnormal event has occurred in the monitoring region, if a ratio of a number of times the audio frame is classified into the abnormal event to a total number of times the classification is performed by the audio classifier for a certain period of time is equal to and greater than a threshold value.

10. The surveillance system of claim 9, wherein, if energy of the audio frame is less than a threshold value, the audio classifier classifies the audio frame into a normal event, and, if the energy of the audio frame is greater than the threshold value, the audio classifier classifies the audio frame into a normal event or the abnormal event.

11. A surveillance method comprising:
predicting a foreground pixel based on foreground region information and motion information extracted from a video frame and performing validation on the predicted foreground pixel based on a texture feature so as to extract a foreground region;
classifying the video frame based on the motion information; and
determining whether an abnormal event has occurred in a monitoring region, based on results of classifications of a certain number of video frames,
wherein the determining whether an abnormal event has occurred comprises:
determining whether an object in the foreground region is a human being, based on information about a size and location of the foreground region, and classifying a foreground region determined to be a human being into a group of people or an individual person, based on information about a shape and location of the foreground region;
predicting the number of people in the video frame based on a result of classification of the foreground region;
classifying the video frame based on a number of foreground regions, a number of people in the video frame, an average motion size of the foreground region, and a degree of consistency of motion directions in the foreground region; and
determining that an abnormal event has occurred in the monitoring region, if a ratio of a number of times an abnormal frame is classified among the certain number of video frames to a total number of times of the classifications is equal to and greater than a first threshold value.

12. The surveillance method of claim 11, wherein the extracting of the foreground region comprises:
separating a background pixel and a foreground pixel of the video frame;
extracting a motion vector of each pixel from the video frame; extracting a texture feature of each pixel by using a correlation between a reference background frame and the video frame and calculating a foreground pixel probability for each pixel from a texture feature histogram; and
comparing a foreground pixel probability of a pixel predicted as a foreground from a predicted foreground region and a region having a motion vector equal to or greater than a predetermined value with a threshold value, and determining the predicted pixel to be a foreground pixel if the product is equal to or greater than the threshold value.

13. The surveillance method of claim 12, further comprising adjusting the foreground pixel probability by using foreground region information of a previous video frame and determining, to be a foreground pixel, a pixel of which the adjusted foreground pixel probability is equal to or greater than the threshold value.

14. The surveillance method of claim 13, further comprising removing a reflector from the foreground region by using a bottom surface model of the monitoring region.

15. The surveillance method of claim 11, wherein the classifying of the video frame comprises classifying the video frame into the abnormal frame if the number of foreground regions in the video frame is equal to or greater than 1, the predicted number of people in the video frame is equal to or greater than 2, the average motion size of the foreground region is equal to or greater than a second threshold value, and the degree of consistency of the motion directions is less than or equal to a third threshold value.

16. The surveillance method of claim 11, further comprising detecting a door-opened/closed state of the monitoring region, and
wherein the predicting of the number of people comprises predicting the number of people in consideration of the door-opened/closed state.

17. The surveillance method of claim 16, wherein the door-opened/closed state is detected based on a number of foreground pixels in an upper region of a door.

18. The surveillance method of claim 11, further comprising:
extracting an audio feature of an audio signal, and determining whether the abnormal event has occurred in the monitoring region, based on the audio feature; and
calculating an audio abnormal probability and a video abnormal probability by respectively accumulating results of the abnormal event occurrence/non-occurrence determinations performed on audio signals and results of abnormal event occurrence/non-occurrence determinations performed on video frames for a certain period of time, and finally determining whether an abnormal situation has occurred in the monitoring region, by using respective combined probability distribution models for a normal situation and the abnormal situation.

19. The surveillance method of claim 18, wherein the determining whether an abnormal event has occurred on the audio signal comprises:
generating an audio frame from the audio signal and extracting the audio feature from the audio frame;
calculating a likelihood between the extracted audio feature and each audio model and selecting an audio model having a highest likelihood;
classifying the audio frame according to a hierarchical approach method; and
determining that the abnormal event has occurred in the monitoring region, if a ratio of a number of times the audio frame is classified into the abnormal event to a total number of times the classification is performed by an audio classifier for a certain period of time is equal to and greater than a threshold value.

20. The surveillance method of claim 19, wherein, in the classifying of the audio frame, if energy of the audio frame is less than a threshold value, the audio frame is classified into a normal event, and if the energy of the audio frame is greater than the threshold value, the audio frame is classified into a normal event or an abnormal event.

* * * * *